United States Patent
Lu et al.

(10) Patent No.: US 10,609,182 B2
(45) Date of Patent: Mar. 31, 2020

(54) NETWORK AND APPLICATION MANAGEMENT USING SERVICE LAYER CAPABILITIES

(71) Applicant: Convida Wireless, LLC, Wilmington, DE (US)

(72) Inventors: Guang Lu, Thornhill (CA); Michael F. Starsinic, Newtown, PA (US); Dale N. Seed, Allentown, PA (US); Lijun Dong, San Diego, CA (US); Catalina M. Mladin, Hatboro, PA (US); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 80 days.

(21) Appl. No.: 15/554,884

(22) PCT Filed: Mar. 2, 2016

(86) PCT No.: PCT/US2016/020407
§ 371 (c)(1),
(2) Date: Aug. 31, 2017

(87) PCT Pub. No.: WO2016/141037
PCT Pub. Date: Sep. 9, 2016

(65) Prior Publication Data
US 2018/0159954 A1     Jun. 7, 2018

Related U.S. Application Data

(60) Provisional application No. 62/126,935, filed on Mar. 2, 2015.

(51) Int. Cl.
G06F 15/173 (2006.01)
H04L 29/08 (2006.01)
H04W 4/70 (2018.01)

(52) U.S. Cl.
CPC .......... *H04L 67/322* (2013.01); *H04L 67/327* (2013.01); *H04L 67/34* (2013.01); *H04W 4/70* (2018.02)

(58) Field of Classification Search
CPC ..... H04L 67/322; H04L 67/34; H04L 67/327; H04W 4/70
See application file for complete search history.

(56) References Cited

U.S. PATENT DOCUMENTS

2009/0175266 A1* 7/2009 Boucadair ............... H04L 45/04
370/352
2011/0213871 A1   9/2011 Digirolamo et al.
(Continued)

FOREIGN PATENT DOCUMENTS

WO       2015/013559 A1     1/2015

OTHER PUBLICATIONS

Presuhn et al., "Management Information Base (MIB) for the Simple Network Management Protocol (SNMP)", Network Working Group Request for Comments: 3418: Standards Track, Dec. 2002, 26 pages.

(Continued)

*Primary Examiner* — Jonathan A Bui
(74) *Attorney, Agent, or Firm* — BakerHostetler

(57) ABSTRACT

Described herein is a Network and Application Management Service (NAMS), which is a new service for the service layer (SL). In accordance with an example embodiment, the NAMS collects, consolidates, and processes information from applications, underlying networks, and other services.

14 Claims, 28 Drawing Sheets

(56) References Cited

U.S. PATENT DOCUMENTS

| | | | |
|---|---|---|---|
| 2012/0005276 A1 | 1/2012 | Guo et al. | |
| 2012/0044865 A1 | 2/2012 | Singh et al. | |
| 2014/0029530 A1* | 1/2014 | Kim | H04W 48/10 370/329 |
| 2014/0254356 A1* | 9/2014 | Jeong | H04L 47/20 370/229 |
| 2014/0254367 A1* | 9/2014 | Jeong | H04L 47/803 370/233 |
| 2014/0369206 A1* | 12/2014 | Karlsson | H04W 60/00 370/236.1 |
| 2015/0103658 A1* | 4/2015 | Okuno | H04W 28/0289 370/232 |
| 2017/0181030 A1* | 6/2017 | Han | H04L 43/0882 |
| 2017/0242730 A1* | 8/2017 | Wang | H04W 28/02 |
| 2018/0159954 A1* | 6/2018 | Lu | H04L 67/34 |

OTHER PUBLICATIONS

OneM2M-TS-0010 MQTT Protocol Binding, V-0.2.0, Jul. 2014, 23 pages.
OneM2M-TS-0009 HTTP Protocol Binding, V1.0.1, Jan. 2015, 13 pages.
OneM2M-TS-0001 Functional Architecture—V-0-4.2, Mar. 4, 2014, 302 pages.
OMA Open Mobile Alliance "Mobile Location Protocol 3.3", Candidate Version 3.3, Oct. 1, 2009, 134 pages.
MQTT Version 3.1.1 OASIS, Committee Specification 01 Approved and Published, May 2014, 3 pages.
Harrington, et al., "An Architecture for Describing Simple Network Management Protocol (SNMP) Management Frameworks", Network Working Group RFC:3411 Standards Track, Dec. 2002, 65 pages.
ETSI TS 102 690 Machine-to-Machine Communications (M2M); Functional Architecture—V2.1.1, Oct. 2013, 332 pages.
3GPP TS 32.299, V12.7.0, Third Generation Partnership Project; Technical Specification Group Service and System Aspects; Telecommunication Management; Charging Management; Diameter Charging Applications (Release 12), Dec. 2014, 164 pages.
3GPP TS 32.101, V11.3.0, Third Generation Partnership Project: Technical Specifications Group Services and System Aspects: Telecommunication Management; Principles and High level requirements (Release 11), Sep. 2014, 67 pages.
3GPP TS 29.368, V12.3.0, Third Generation Partnership Project; Technical Specification Group Core Network and Terminals; Tsp interface protocol between the MTC Interworking Function (MTC-IWF) and Service Capability Server (SCS) (Release 12), Dec. 2014, 28 pages.
3GPP TS 29.329, V12.5.0, Third Generation Partnership Project; Technical Specification Group Core Network and Terminals; Sh Interface based on the Diameter protocol; Protocol details (Release 12), Dec. 2014, 23 pages.
3GPP TS 29.214, V13.1.0, Third Generation Partnership Project; Technical Specification Group Core Network and Terminals; Policy and Charging Control over Rx reference point (Release 13), Mar. 2015, 64 pages.
3GPP TS 29.198, V3.4.0, Third Generation Partnership Project; Technical Specification Group Core Network; Open Service Architecture (OSA), Application Programming Interface (API)—Part 1 (Release 1999), Jun. 2001, 166 pages.
3GPP TS 29.109, V12.0.0, Third Generation Partnership Project; Technical Specification Group Core Network and Terminals; Generic Authentication Architecture (GAA); Zh and Zn Intefaces Based on the Diameter Protocol; Stage 3 (Release 12), Sep. 2014, 70 pages.
3GPP TS 23.682, V12.0.0, Third Generation Partnership Project: Technical Specification Group Services and System Aspects; Architecture Enhancements to Facilitate Communications With Packet Data Networks and Applications (Release 12), Dec. 2013, 33 pages.
3GPP TR 23.862, V12.0.0, Third Generation Partnership Project: Technical Specification Group Services and System Aspects; Evolved Packet Core (EPC0 enhancements to support interworking with data application providers; Stage 2, (Release 12), Dec. 2013, 23 pages.
"W3C Network Information API", http://www.w3.org/TR/netinfo-api/, Downloaded Nov. 10, 2018, 2 pages.

* cited by examiner

| A | NAMS at the Service Layer in SCS |
| B | NSE at MTC-IWF |
| C | NSE at GGSN/P-GW |
| D | Service layer at UE including NAMS |

Enter Application Specific Information Below: 2602

- Application Type:
- Application ID:
- Application Name:
- Application Status (active, dormant):
- Application Data Type:
- Application Data Transmission Rate:
- Application Data Transmission Schedule:
- Application Actions Based on Service Layer Events:

Service Layer Events to Application 2604

- *A better network connection is available, would you like to switch?*
- *Network is congested, ok if application data transmission rate is decreased?*
- *Network is congested, ok if application data is re-scheduled to time X?*
- *Network is congested, ok if application data resolution is reduced?*

FIG. 26

NETWORK AND APPLICATION MANAGEMENT USING SERVICE LAYER CAPABILITIES

CROSS REFERENCE TO RELATED APPLICATIONS

This application is a National Stage Application filed under 35 U.S.C. 371 of International Application No. PCT/US2016/020407 filed Mar. 2, 2016, which claims the benefit of U.S. Provisional Patent Application Ser. No. 62/126,935, filed Mar. 2, 2015, the disclosure of which is hereby incorporated by reference as if set forth in its entirety herein.

BACKGROUND

The oneM2M standard under development defines a service layer called a "Common Services Entity (CSE)," which is shown in FIG. 1. The CSE is further described in oneM2M-TS-0001, oneM2M Functional Architecture (V0.4.2), which is incorporated by reference as if its contents are presented herein. A purpose of the service layer is to provide "horizontal" services that can be utilized by different "vertical" machine-to-machine (M2M) silo systems and applications, such as, for example, systems and applications related to e-Health, fleet management, and smart homes. Referring to FIG. 1, the CSE supports four reference points. The Mca reference point interfaces with the Application Entity (AE). The Mcc reference point interfaces with another CSE within the same service provider domain, and the Mcc' reference point interfaces with another CSE in a different service provider domain. The Mcn is a standardized interface that allows the CSE to access functions in underlying network(s), while also keeping an underlying network mostly transparent to the CSE. The Mcn reference point interfaces with the underlying network service entity (NSE). An NSE provides underlying network services to the CSEs, such as device management, location services, and device triggering for example. The NSE's interfaces to the underlying network are not defined by oneM2M. Such interfaces are typically defined by the underlying network, but they may be proprietary interfaces that are defined by the network operator.

Referring also to FIG. 2, a given CSE may contain multiple logical functions called "Common Service Functions (CSFs)." Example CSFs include, presented without limitation, "Discovery" and "Data Management & Repository." FIG. 2 illustrates CSFs under development at oneM2M. The illustrated Network Service Exposure, Service Execution and Triggering (NSSE) function interfaces with the underlying network(s). Current functions supported by NSSE are device triggering and location management. The Application and Service Layer Management (ASM) CSF shown in FIG. 2 provides software configuration and management for the software module of a CSE or an application entity (AE), for example, to install, activate, and de-activate software at the service layer.

Prior to oneM2M, ETSI M2M published its own service layer oriented M2M standard, which is defined in ETSI TS 102.690, Machine-to-Machine (M2M) Functional architecture (V2.1.1), which is incorporated by reference as if its contents are set forth herein. The architecture of oneM2M is similar to ETSI M2M. ETSI M2M defined the Service Capability Layer entity that consists of various service modules called Service Capabilities. The services can be exposed to the underlying network by the Network Exposure Service Capability.

Referring now to FIG. 3, 3GPP defined the MTC architecture in 3GPP TS 23.682, Architecture enhancements to facilitate communications with packet data networks and applications, Release 11, V12.0.0, which is incorporated by reference as if its contents are set forth herein. The MTC Application in the external network is typically hosted by an Application Server (AS) and may make use of an SCS for additional value added services. The 3GPP system provides transport, subscriber management, and other communication services (e.g., control plane device triggering) including various architectural enhancements for MTC devices. 3GPP defined three communication models for MTC devices: direct model, indirect model, and hybrid model. In the direct model, the AS connects directly to the operator network in order to perform direct user plane communications with the user equipment (UE) without the use of any external SCS. The Application in the external network may make use of services offered by the 3GPP system. In the indirect model, the AS connects indirectly to the operator network through the services of an SCS in order to utilize additional value added services for MTC (e.g., control plane device triggering). In the hybrid model, the AS uses the direct model and indirect model simultaneously in order to connect directly to the operator's network to perform direct user plane communications with the UE, while also using an SCS. From the 3GPP network perspective, the direct user plane communication from the AS and any value added control plane related communications from the SCS are independent and have no correlation to each other even though they may be servicing the same MTC Application hosted by the AS.

FIG. 3 is reproduced from the oneM2M architecture specification referenced above. FIG. 3 depicts how the oneM2M reference points can apply to the 3GPP MTC architecture. An Application Service Node is a Node that contains one Common Services Entity (CSE) and contains at least one Application Entity (AE). For example, an Application Service Node can be an M2M device. An Infrastructure Node (IN) is a Node that contains one Common Services Entity and contains zero or more Application Entities. For example, an IN can be a network server. The Mcc referent point shown in FIG. 3 is between the IN-CSE and the ASN-CSE on top of the 3GPP network.

3GPP defines its Operations, Administration, Maintenance (OAM) architecture for network management in 3GPP TS 32.101 Telecommunication Management: Principles and high level requirements, which is incorporated by reference as if its contents are set forth herein. As described, a Network Manager (NM) provides a package of functions with the responsibility for the management of Network Elements, such as devices and equipment. The management functions include account management, fault management, quality of service (QoS), performance management, etc. The management procedures are supported by open standards, such as Simple Network Management Protocol (SNMP) for example.

The Simple Network Management Protocol (SNMP), as defined in RFC 3411, is considered to be an application layer protocol in the OSI model. SNMP is commonly used to manage devices in networks. A computer network system that uses SNMP for network management may consist of the following components: the SNMP manager, the SNMP agent, and the SNMP Management Information Base (MIB). The SNMP manager may be software that runs on the machine of a network administrator or any human manager managing the computer network. The SNMP agent may refer to software that runs on the network node that is to be monitored. This node may be a printer, router, etc. The SNMP MIB, which is defined in RFC 3418, is a component that ensures that the data exchange between the manager and the agent remains structured. The MIB is constructed in a tree structure, and the basic component of the structure is an object. For example, the system up time can be represented as "iso.org.dod.internet.mgmt.mib-2.system.sysUpTime".

SNMP communication between manager and agent takes place in form of messages. Basic example messages used for communication include: SNMP GET, SNMP GET-NEXT, SNMP GET-RESPONSE, SNMP SET, and SNMP TRAP. The messages GET and GET-NEXT are used to fetch the value of a particular MIB object. The message GET-RESPONSE is used mostly by the agent to send the response to a GET or GET-NEXT message. The message SET is used by the manager to set the new value of a particular MIB object at the agent. The message TRAP is used by the agent to send information about some alarming values for some object to the manager.

Through SNMP, one can retrieve information about network devices such as routers, printers, hubs, or general computers. Retrieved information may include system up time, CPU usage level, network settings, or the like. The devices can also be configured by SNMP.

SNMP usually works with policies to provide an overall management framework. For example, a network administrator can configure an event policy that raises traps for events based on system log messages. Threshold poll policies can set up different thresholds to monitor system and network information, such as memory usage for example.

A W3C Network Information API provides an interface for web applications to access the underlying connection information of a device. The W3C specification currently requests the user agent to expose two properties: bandwidth and metered. It seems that the interface is directly between applications and the underlying network.

Potential network connectivity issues, such as overloading, congestion, and weak signal strength, can cause non-optimized end-to-end M2M connections, such as, but not limited to, connection interruptions for example. In some cases, applications running over the networks are not aware of the network situation, or applications may be only aware of the condition of the local network where they reside. Network issues can cause long delays and even drop of connections at the application level. Such issues can apply to non-M2M systems as well as M2M systems. The issues may be more obvious in M2M networks than non-M2M systems due to various factors such as, for example, a large number of applications, the constrained (e.g., low-power, lossy) devices, and limits in local networks. For example, constrained applications might not be able to support build-in intelligence to handle connection issues. As another example, constrained application may keep their transaction regardless of a change of network connection. As yet another example, constrained applications typically cannot adapt their transactions with the consideration of other applications. Thus, as described above, current approaches to network and application management, for instance in networks with resource constrained (e.g., M2M) devices, lack capabilities and efficiencies.

SUMMARY

Described herein is a Network and Application Management Service (NAMS), which is a new service for the service layer (SL). In accordance with an example embodiment, the NAMS collects, consolidates, and processes information from applications, underlying networks, and other services. The NAMS may produce output based on its own policies to optimize applications and underlying networks. Although many examples are presented herein in the context of an M2M system, it will be understood that the NAMS may be implemented in M2M systems and non-M2M systems.

In an example embodiment, an apparatus, which includes the NAMS, comprises a processor, a memory, and communication circuitry. The apparatus is connected to a communications network via its communication circuitry, and the apparatus further comprises computer-executable instructions stored in the memory of the apparatus which, when executed by the processor of the apparatus, cause the apparatus to receive, via the communication network from a first node on the network, a first message indicating at least one status update associated with the network. The apparatus may store the at least status one update associated with the network, and determine whether the at least one status update affects an application or a service. If the at least one status update affects the application or the service, the apparatus may send, to a second node that hosts the application or the service, a second message indicating the at least status one update such that the application or service can take action based on the at least status one update.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

As used herein, unless otherwise specified, the term "service layer" refers to a logical entity. A service layer can consist of service functions that can be shared by applications on top of the service layer, such as machine-to-machine (M2M) applications or internet of things (IoT) applications for example. Unless otherwise specified, the terms M2M and IoT can be used interchangeably, without limitation. The term "end node" refers to devices (e.g., a constrained device) that may or may not contain a service layer entity. An infrastructure node, as used herein, may refer to a network server that contains the service layer entity, and may or may not contain applications. A middle node, as used herein, refers to a gateway that contains a service layer entity and may or may not contain applications. Turning now to example reference points used herein, the Mca reference point designates communications between applications and the service layer. The Mcn reference point designates communications between the service layer and the underlying network. The Mcc reference point designates communications between one service layer and another service layer that are within the same service provider domain as each other. The Mcc' reference point designates communications between one service layer and another service layer that are in different service provider domains from each other. The Mff reference point designates communications between different service functions within the same service layer as each other.

Figure 1:
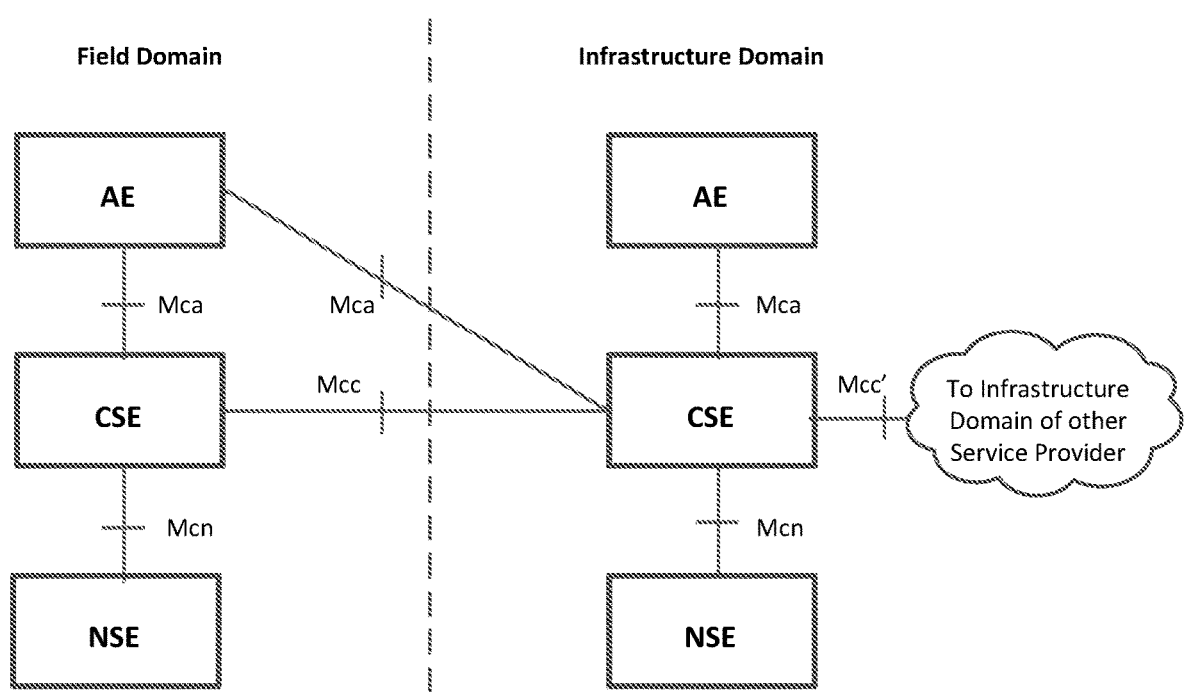
FIG. 1 is a block diagram of the oneM2M architecture.
Figure 2:
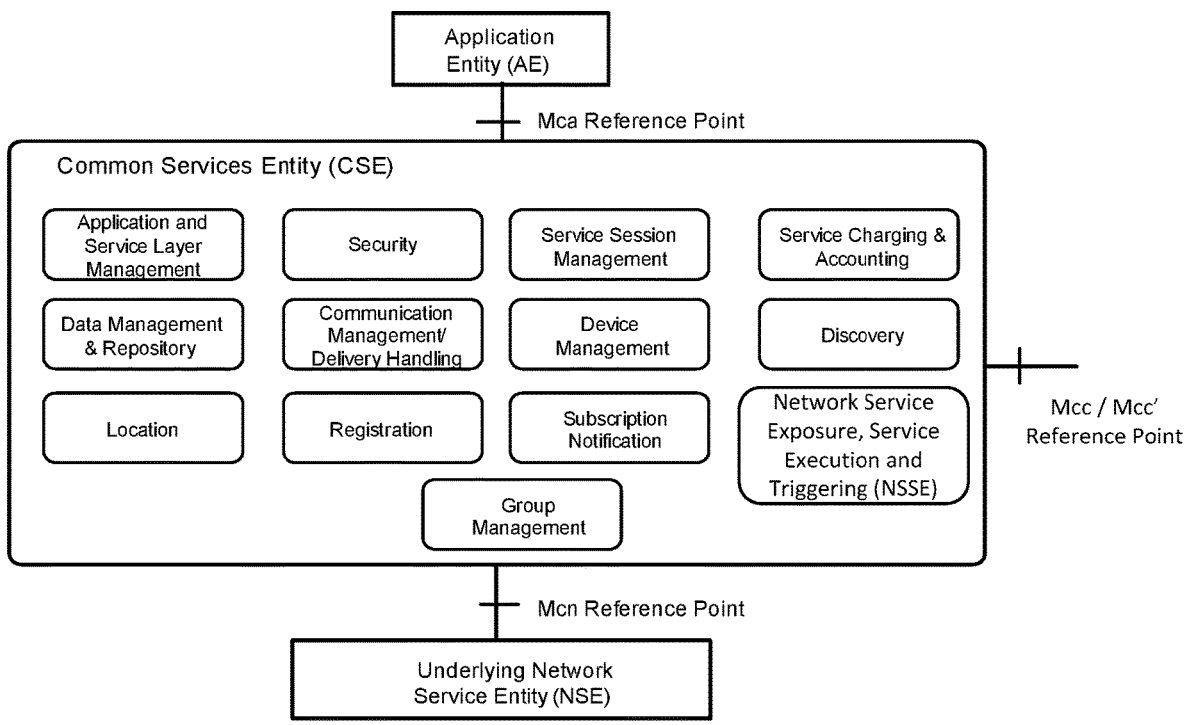
FIG. 2 illustrates Common Service Functions (CSFs) of the one M2M architecture.
Figure 3:
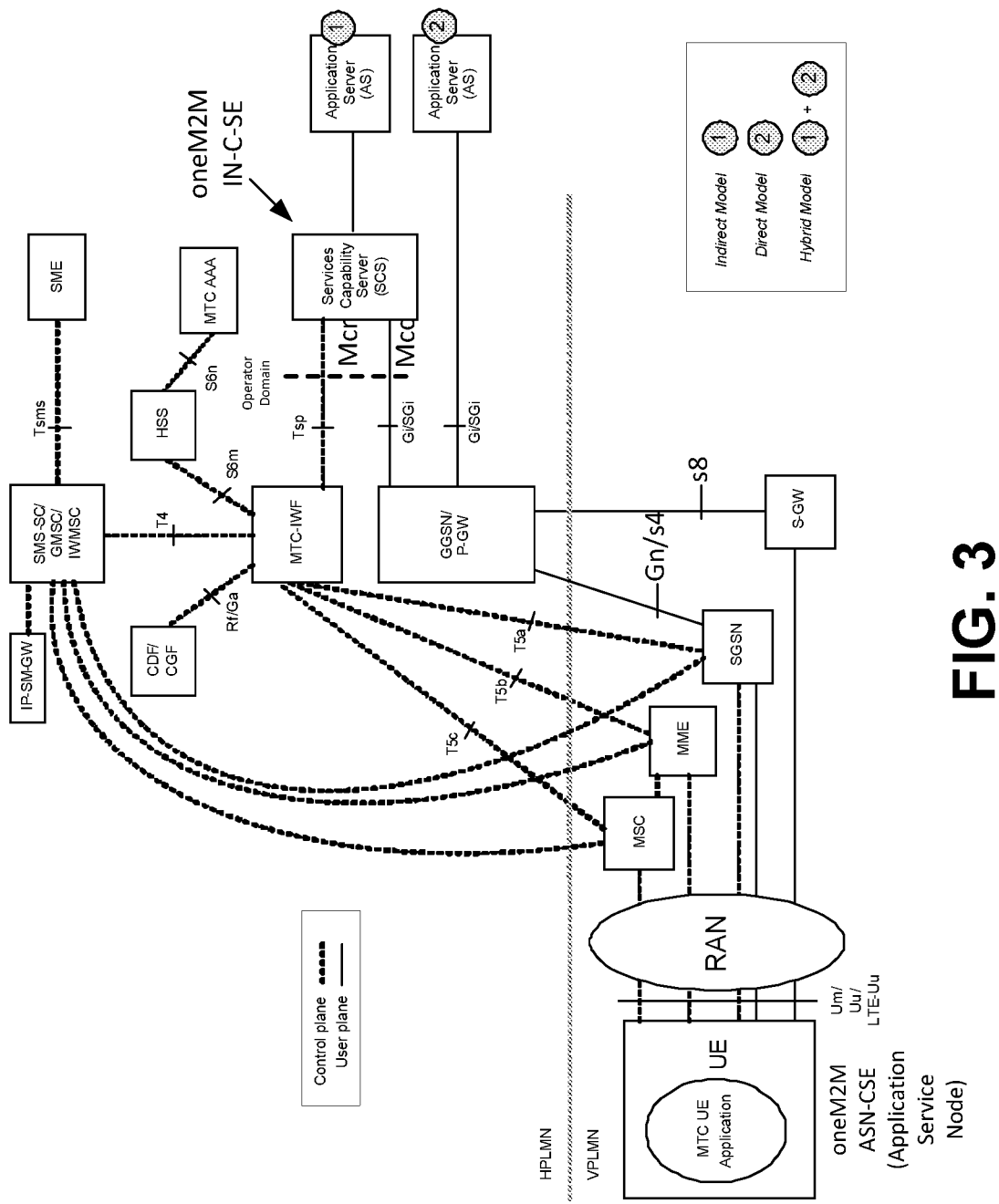
FIG. 3 is a block diagram of the 3GPP architecture for Machine-Type Communication (MTC)
Figure 4:
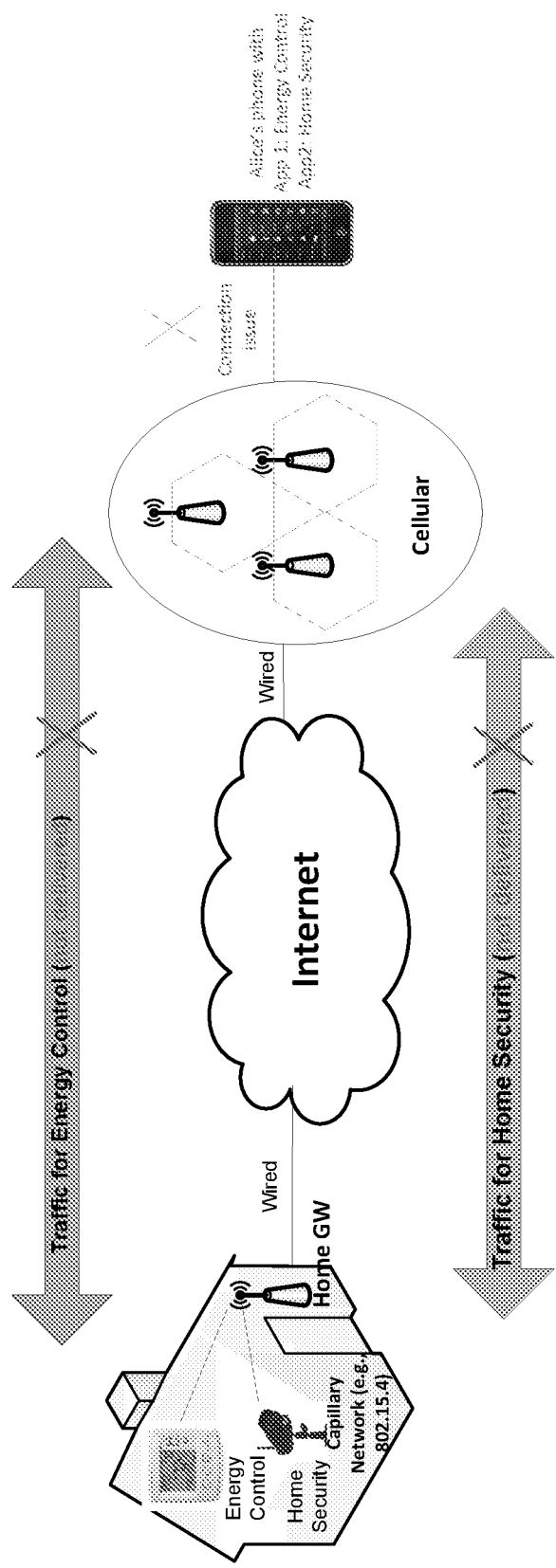
FIG. 4 depicts an example machine-to-machine system (M2M) that does not include a Network and Management Service (NAMS)

As described above, various network issues can cause non-optimized M2M connections. By way of example, FIG. 4 depicts an example of problems that can be associated with an M2M system. Referring to FIG. 4, a user (Alice) has two smart home applications (apps) on her phone. One application is for energy control and one application is for home security. She receives reports from the surveillance camera and energy control system from time to time, and she can configure the systems remotely. On her way home, Alice takes the subway for one hour and loses cellular signal on her smart phone during that time. During this period of time, any report from her home energy control and security systems will not be delivered. However, due to the constrained nature of the apps and devices, they are not aware of the change of connection on the phone, and cannot prevent sending the undeliverable messages.

It is recognized herein that existing mechanisms mentioned above do not adequately address the issues illustrated in the example above, among others. For example, by using network management protocols such as SNMP, the network administrator can get the alarm of the network connection, and can configure the devices. It is recognized herein that existing SNMP policies can be used to configure the triggering of the alarms. SNMP, however, does not have application information, and thus cannot inform applications to prevent interruptions to applications. It is further recognized herein that the 3GPP Network Management function can manage the cellular connection, but it does not manage capillary and local networks, nor does it have information concerning capillary and local networks. Cross layer network management mechanisms involve different layers, such as MAC, IP, and application layer protocols in a node. Such mechanisms may mitigate the impact of the underlying network to upper layers in the same node, but have limits to manage end-to-end scenarios. For example, if the connections are based on TCP, the TCP congestion control and slow start can reduce the amount of data sent.

Thus, it is recognized herein that existing mechanisms do not fully address problems, for example due to the limited role and information they have, in an end-to-end system. Existing mechanisms are also reactive in nature, and thus they are not designed to prevent various issues from occurring.

It is recognized herein that the Service Layer, as compared to existing mechanisms, is a candidate for addressing various problems, such as the problem illustrated by the example above, because the Service Layer is aware of information from applications, services, and underlying networks. Further, the Service Layer can aggregate such information for network and application management purposes. Currently there is no service that can oversee and manage different underlying networks and provide appropriate information to applications (or visa-versa). Additionally, it is recognized herein that the Service Layer can provide advanced optimization to the end-to-end communication that is not currently available. As described herein, implementing various functions at the service layer can also relieve applications from certain interactions with the underlying networks. This can be particularly useful for resource-constrained devices, such as M2M devices for example.

Embodiments described herein address various communication issues, such as the end-to-end communication problem illustrated by the example above. As described below, in an example embodiment, conditions of various underlying networks involved in end-to-end communications can be exchanged between each other. These networks may belong to different operators. Similarly, the characteristics of applications involved in the end-to-end communications can be exchanged and known to the underlying networks. Such exchange of information may be across applications, across networks, and across regions. It is recognized herein that the Service Layer (SL) is a good candidate to achieve various communication goals because the SL resides between applications and underlying networks. The SL can exchange application and network related information horizontally with another SL. As described herein, the SL can also have policies associated therewith and can process aggregated information intelligently.

In accordance with an example embodiment further described below, an architecture framework enables the SL to provide valuable input for applications, underlying networks, and other services. Thus, the SL can not only provide optimal solutions to address existing issues, it can also enable new communication models that not currently available. This disclosure describes a Network and Application Management Service (NAMS) as a new service for the SL. In accordance with an example embodiment, the NAMS collects, consolidates, and processes information from applications, underlying networks, and other services. The NAMS may produce output based on its own policies to optimize applications and underlying networks. Although many examples are presented herein in the context of an M2M system, it will be understood that the NAMS may be implemented in M2M systems and non-M2M systems.

By way of introduction, in accordance with an example embodiment, an SL architecture includes the NAMS, which includes various sub-functions such as Network and Application Management, Application Adaptation, Network Adaptation, and Service Adaptation. Various operations and messages that are sent over various reference points (e.g., Mca, Mcc, Mcc', Mcn, Mff) are described below. Various operations performed by the NAMS are described below. Further, defined herein is specific information that can be aggregated and produced by the NAMS.

FIGS. 5-16, 18-22, and 24 (described hereinafter) illustrate various embodiments of methods and apparatus for managing networks and applications. In these figures, various steps or operations are shown being performed by one or more clients, servers, and/or proxies. It is understood that the clients, servers, and proxies illustrated in these figures may represent logical entities in a communication network and may be implemented in the form of software (i.e., computer-executable instructions) stored in a memory of, and executing on a processor of, a node of such network, which may comprise one of the general architectures illustrated in FIG. 25A or 25B described below. That is, the methods illustrated in FIGS. 5-16, 18-22, and 24 may be implemented in the form of software (i.e., computer-executable instructions) stored in a memory of a network node, such as for example the node or computer system illustrated in FIG. 25C or 25D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 25C and 25D, respectively) of the node under control of the processor of the node and the computer-executable instructions (e.g., software) that it executes.

Figure 5:
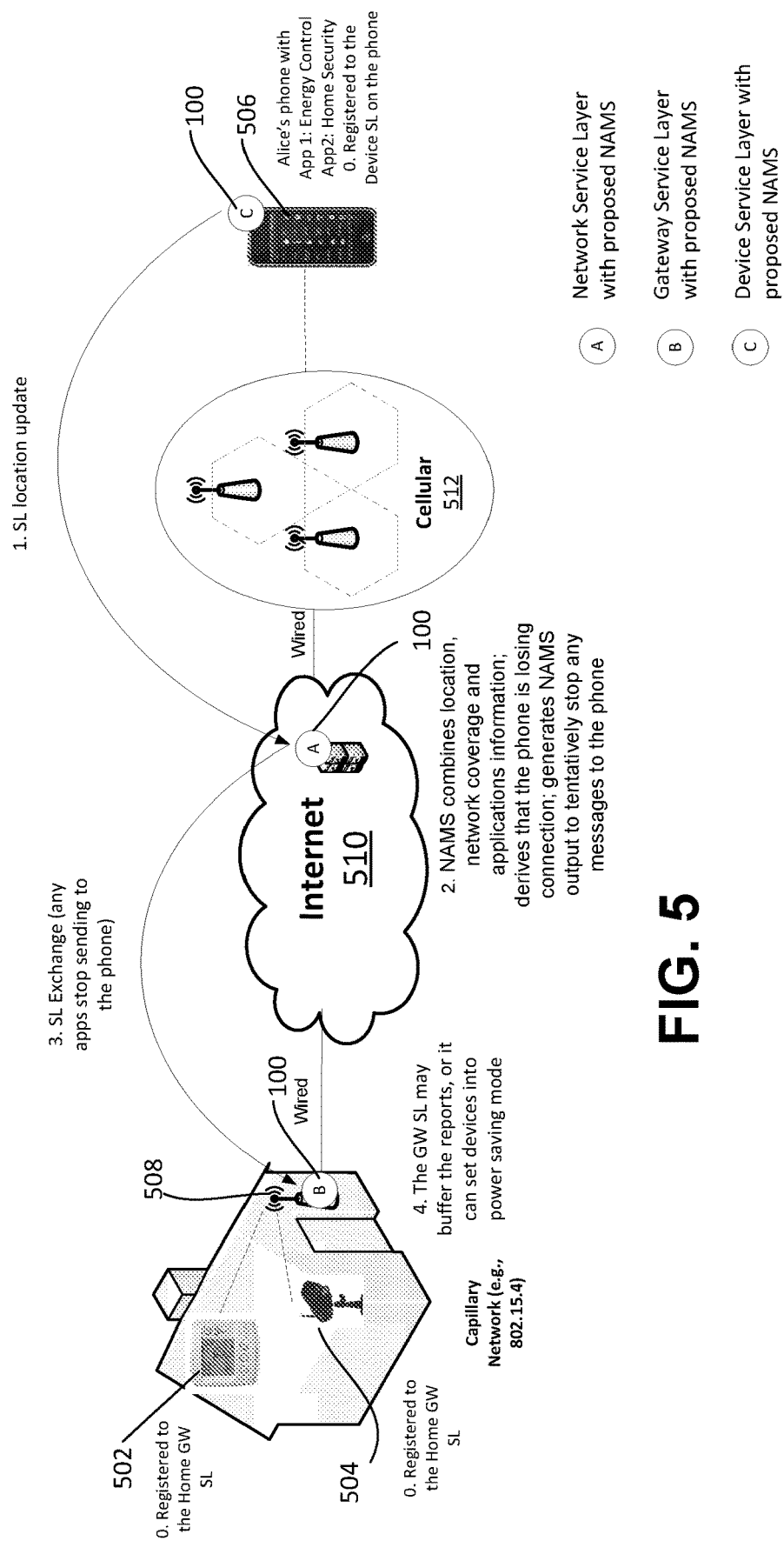
FIG. 5 is depicts the example M2M system depicted FIG. 4, but also includes the NAMS in accordance with an example embodiment.

Referring now to FIG. 5, an example use case of how the problem illustrated in FIG. 4 is resolved with a NAMS 100 and messages related thereto is illustrated in accordance with an example embodiment. The circles indicate where the SL resides in the illustrated use case. It will be understood that reference numbers are repeated in various figures to denote the same or similar features.

Still referring to FIG. 5, in accordance with the illustrated example, at 0, an energy control app (App1) and a home security app (App2) are registered to the SL on the user's (Alice's) smart phone 506. A smart thermostat 502 and a security camera 504 are both registered to the SL at a home gateway (GW) 508. At 1, the smart phone 506 uses a location service at the SL in the infrastructure node (shown in the cloud 510, which can generally be referred to as the internet 510 or the network 510, without limitation). In accordance with illustrated example, the phone 506 periodically reports its location to the SL at the cloud 510. In the example, the phone 506 reports its update when Alice enters the subway. At 2, the NAMS 100 at the infrastructure node has previously obtained network coverage information from the underlying cellular network 512. In some cases, the NAMS 100 receives the geographic coverage of the network 512. The NAMS 100 at the infrastructure node has a policy that triggers the NAMS 100 to evaluate whether a device, such as the phone 506 for example, is losing coverage based on its location update. If the device is losing coverage, the NAMS 100 may stop any transactions that target applications on the device that is losing coverage. In accordance with the illustrated example, the NAMS 100 determines that the phone 506 is losing its network connection.

At 3, in accordance with the illustrated example, the NAMS 100 sends an SL exchange message to other SLs that contain the applications communicating with App1 and App2. Example exchange messages are listed in Table 1 below, and are further described below. The SL exchange messages indicates that messages to App1 and App2 on the device (phone 506) SL should be stopped. The NAMS 100 can obtain such information from other services at the SL, such as application registration and data exchange services. At 4, upon receiving the SL exchange message, the SL at the Home GW 508 can make decisions based on its own policy. For example, the SL at the Home GW 508 can buffer the messages for App1 and App2. Alternatively, or additionally, the SL at the Home GW 508 can send messages to the energy control device 502 and the home security device 504 to stop them from sending messages to App1 and App2.

Thus, as shown by the example use case of FIG. 5, the NAMS can prevent communication issues from occurring, and thus can also reduce network traffic, improve application communication experience for users, etc. Further, the NAMS 100 can relieve constrained devices and applications from the burden of supporting advanced features to address various issues, such as the issues described in the example use case above. For example, the NAMS 100 can enable constrained devices and applications to only have to support simple logic and light protocols. The NAMS 100 can associate information available at the SL from different nodes, and make integrated decisions and actions, for multiple devices, applications, or underlying networks.

Figure 6:
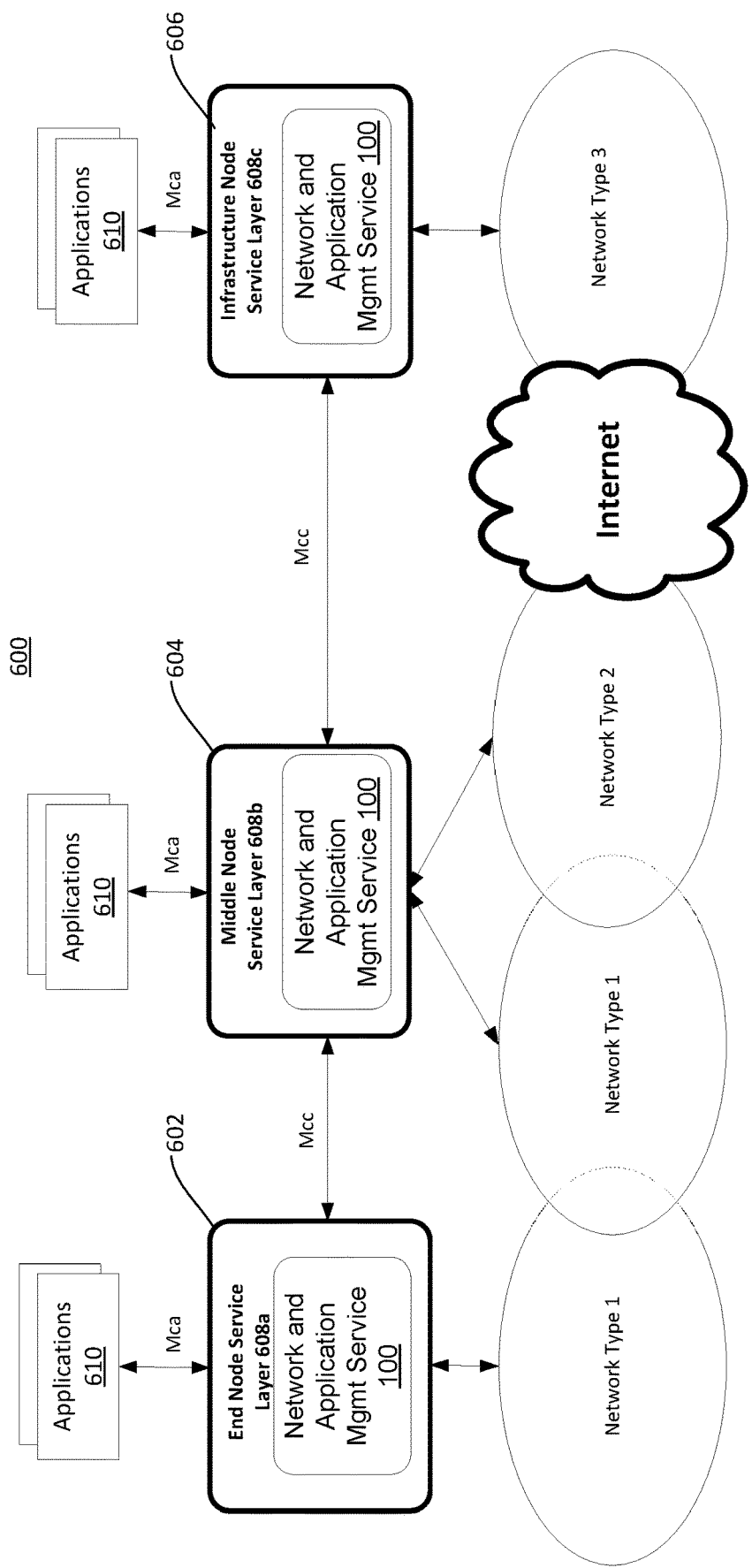
FIG. 6 shows how the Network and Application Management Service (NAMS) can fit in a Service Layer (SL) architecture, in accordance with an example embodiment.

Referring now to FIG. 6, an example Service Layer architecture 600 is shown. FIG. 6 provides a high level view of how the Network and Application Management Service (NAMS) 100 can fit in an SL architecture, for instance the SL architecture 600. The SL architecture includes an end node 602, a middle node 604, and an infrastructure node 606. Each of the nodes include a service layer 608. For instance, as shown, the end node 602 includes a first SL 608a, the middle node 604 includes a second SL 608b, and the infrastructure node 606 includes a third SL 608c. Thus, as shown, the SL architecture 600 includes Service Layer middleware in each of the illustrated nodes, and each of the Service Layers contains the Network and Application Management Service function 100. Each node is connected to an underlying access network. By way of example, the end node 602 may be connected to a 802.15.4 network. By way of further example, as shown the middle node 604 may have two radios (e.g., one for 802.15.4 so it can connect to a group of end nodes, and one for 3GPP cellular network to connect to the backbone network). The infrastructure node may connect to the Internet via a wired network. The service layers 608 at different nodes can communicate with each other. Each of the nodes can host or more applications 610. It will be understood that the underlying networks can vary as desired.

Figure 7:
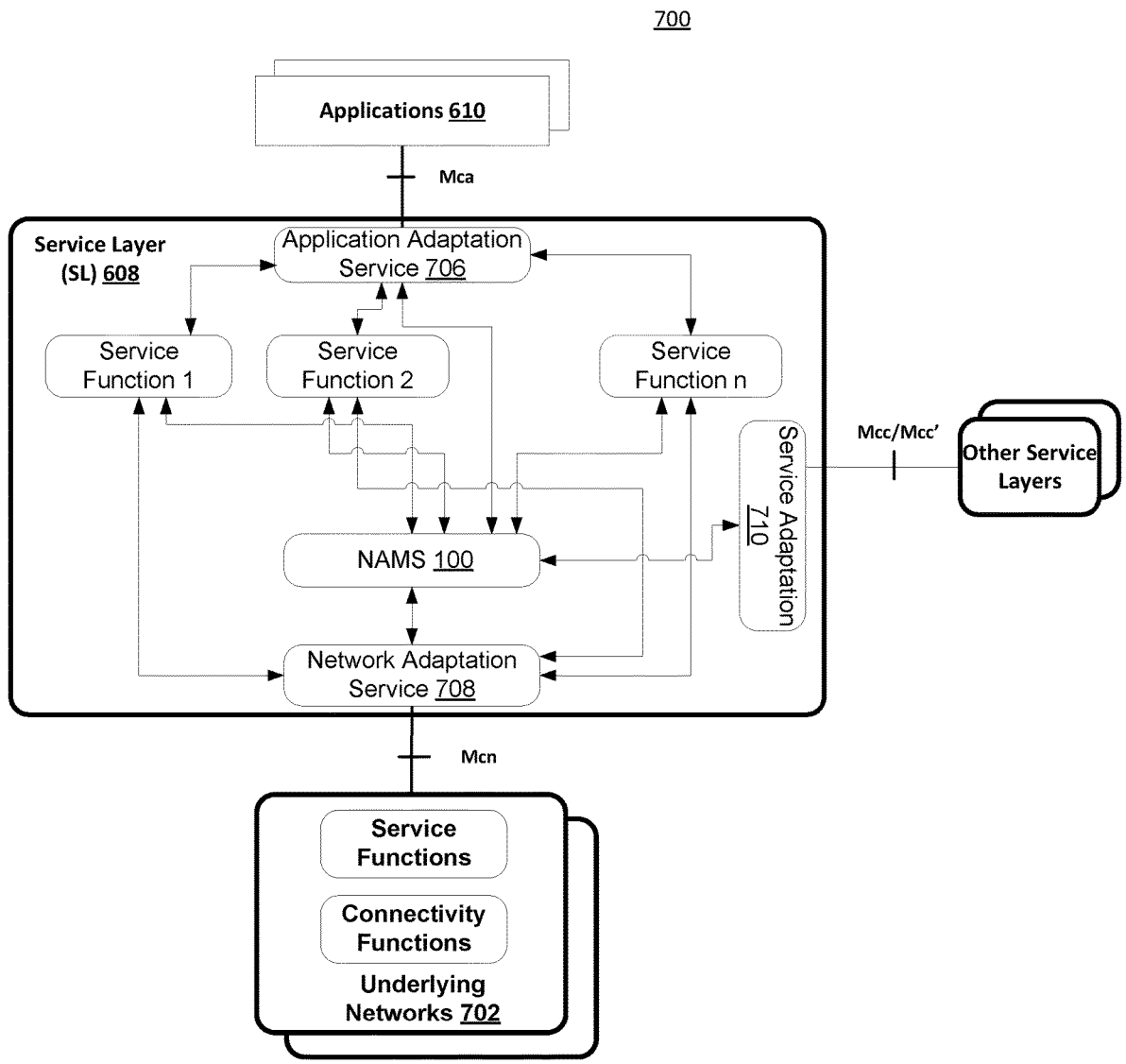
FIG. 7 shows how the NAMS can fit into a Service Layer functional architecture, in accordance with an example embodiment.

Referring now to FIG. 7, an example Service Layer functional architecture 700 is shown. FIG. 7 shows how the NAMS 100 can fit into a Service Layer functional architecture, for instance the SL functional architecture 700. As described herein, in accordance with various embodiments, the NAMS 100 is a service residing at the service layer, for instance a service layer 608 depicted in FIG. 7. The NAMS 100 may receive and process information from the applications 610, generate requirements for underlying networks, for instance underlying networks 702 depicted in FIG. 7, and convey the results to the underlying networks 702. The NAMS 700 can also receive information from the underlying networks, process the information, and pass the information to applications. Further detail concerning logic and operations that may be performed on the reference points is presented below. Although the reference points that are illustrated are the oneM2M reference points, it will be understood that the oneM2M reference points are presented for purposes of example, and the NAMS 100 may be implemented using other reference points in addition to oneM2M as desired.

In accordance with the illustrated embodiment, adaptation services are proposed that facilitate the NAMS 100. Example adaptation services include an Application Adaptation Service 706, a Network Adaptation Service 708, Service Adaptation 710. The Application Adaptation Service 706 may serve as the contact and aggregation point for applications 610. The Network Adaptation Service 708 may serve as the contact and aggregation for the underlying networks 702. The Service Adaptation 710 may service as the contact and aggregation point between two or more Service Layer entities.

In accordance with an example embodiment, the use of Adaptation Services is optional for the NAMS 100. The Adaptation Services may increase the efficiency of communication between the NAMS 100 and other entities. Alternatively, for instance if the Service Layer 608 does not include the above-described adaptation services, the NAMS 100 interface directly with various applications 610, underlying networks 702, and other Service Layers. For instance, in the example depicted in FIG. 8, the adaptation services are sub-functions of the NAMS 100. In the alternative example depicted in FIG. 9, the adaptation services are separate from the NAMS 100.

Figure 8:
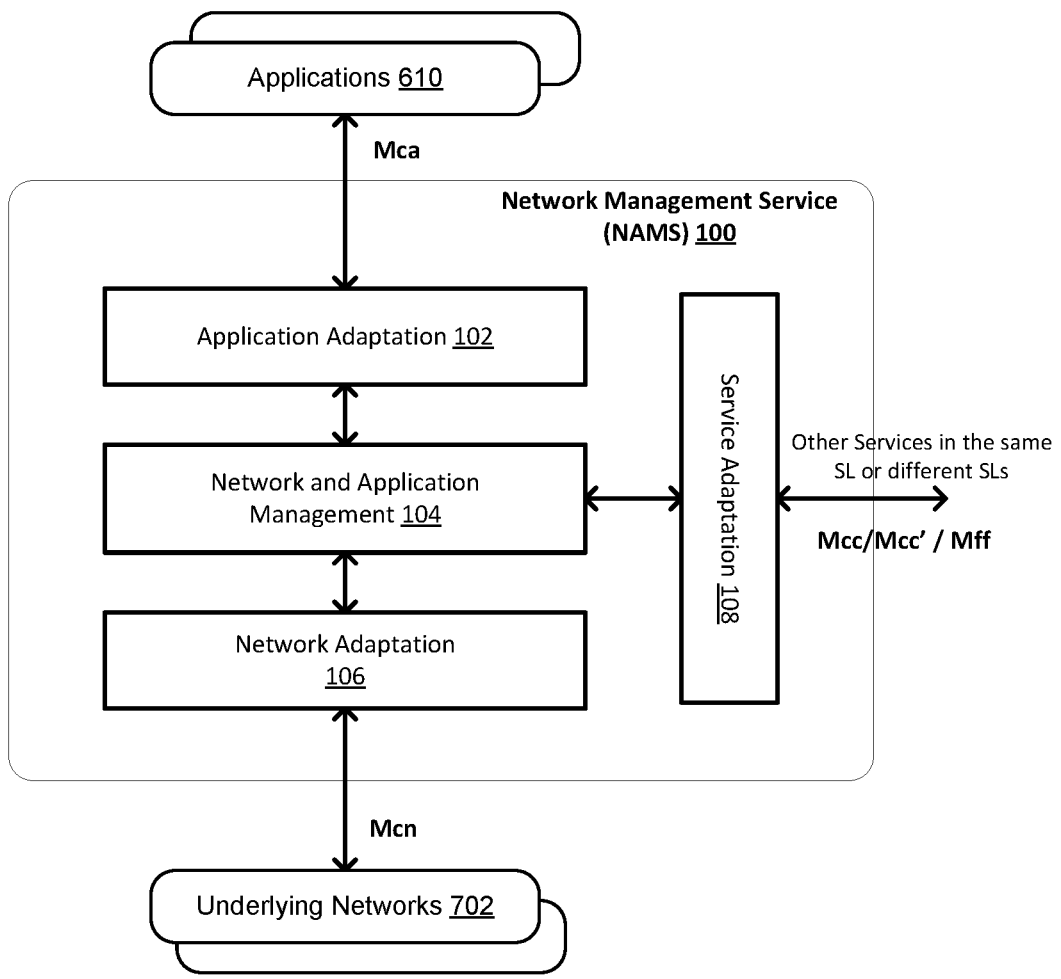
FIG. 8 is a block diagram of the NAMS that shows example subfunctions of the NAMS in accordance with an example embodiment.

Referring to FIG. 8, in accordance with the illustrated embodiment, the NAMS 100 contains Adaptation subfunctions, for instance an application adaptation subfunction 102, a network and application management subfunction 104, a network adaptation subfunction 106, and a service adaptation subfunction 108. Thus, the NAMS 100 directly interfaces with applications 610 (via Mca), underlying network functions (via Mcn), and other services on the same Service Layer (via Mff) or different Service Layers (via Mcc or Mcc').

Figure 9:
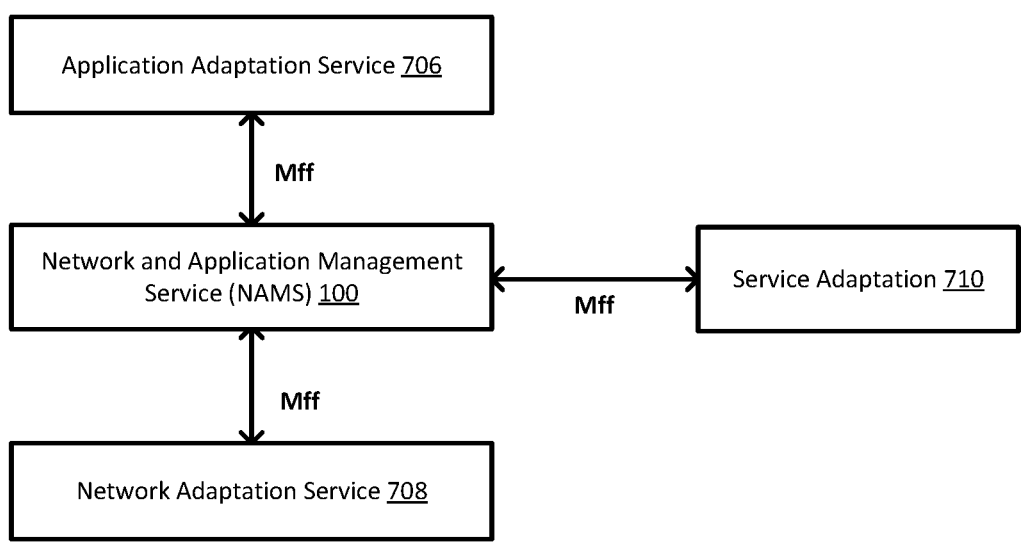
FIG. 9 shows the subfunctions of FIG. 8 as standalone adaptation services that interact with the NAMS in accordance with another example embodiment.

Referring to an alternative embodiment depicted in FIG. 9, the adaptation services, which can also be referred to as adaptation functions, are generic functions that may serve other services (e.g., other CSFs) in addition to the NAMS 100. Thus, the adaptation services are outside of the NAMS 100. As shown in FIG. 9, the NAMS 100 may interface with the adaptation functions via Mff. Thus, the adaptation functions not only contain features that are related to the NAMS 100, but the adaptation functions may also contain features (e.g., service dispatching and consolidating) that may be used by other services, applications, and/or underlying networks.

Example subfunctions of the NAMS 100 are now described. As described above, the subfunctions can also be implemented as services that are separate from the NAMS 100. Thus, it will be understood that the description below may refer to subfunctions of the NAMS 100 for convenience, though the subfunctions can be implemented as standalone services. Similarly, it will be understood that the description below may refer to services that interact with the NAMS 100 for convenience, though the services can be implemented as subfunctions within the NAMS 100.

In an example embodiment, the Network and Application Management subfunction 104 is the processing center for the NAMS 100. The Network and Application subfunction 104 may have information collected from applications (via the Application Adaptation function 102), information from underlying networks (via the Network Adaptation function 106) and information from other services (via the Service Adaptation function 108). In some cases, the main function of the NAMS 100 is to analyze the information from applications, services, and underlying networks to optimize communications.

The NAMS 100 may make associations of the information it collects so that it can analyze the collected information. For example, the NAMS 100 may associate an application with the underlying network that the application is running on. Often such information is not included in application registration information. Thus, for example, to associate an application with the underlying networks involved, the NAMS 100 can determine the Service Layer to which the application registered (e.g., from the "registration" service), and the NAMS 100 can then determine the underlying network for the determined Service Layer. As illustrated in FIG. 8, the NAMS 100 has interface (Mff) to other services with the same service layer. Different NAM services (NAMSs) can exchange their outputs with each other via the Mcc reference point.

The NAMS 100 may make decisions or recommendations and generate output based on its policies. In some cases, policies are configurable and each NAMS can hold multiple policies that are different from each other. Depending on a business relationship, for example, the policies can be provided by the Service Providers, by the operators of the underlying networks, or by applications. Different policies can apply to different scopes. By way of example, a policy of a given Service Provider may apply to all applications registered to the Service Layer by the given Service Provider. By way of another example, a policy of a given application may only affect other applications having transactions with the given application. A policy can define the nodes to which the policy applies, and the criteria and logic to make certain decisions. For example, given an example situation or scenario, different policies can yield different solutions based on their own logic. An example embodiment of a policy resource structure is described below.

Example policies at the NAMS 100 and related operations are presented below. It will be understood that other polices can be implemented at the NAMS 100 as desired.

For example, an Applications Bandwidth Regulation Policy may provide a bandwidth requirement to an SL when an application registers to the SL. In some cases, when the node where the SL resides connects to the underlying network, the underlying network provides the bandwidth it supports to the SL. In an example embodiment, the NAMS 100 has access to both the bandwidth requirement and the supported bandwidth. Further, the NAMS 100 may determine that the aggregated bandwidth required by the running applications exceeds the bandwidth supported by the underlying network, and based on the policy, the NAMS 100 may take action. For example, the NAMS 100 may instruct select applications to reduce rate, or it may instruct the underlying network to increase transmission rate. By doing so, the NAMS 100 can prevent situations in which application(s) run with sub-optimal performance due to a network bandwidth limit.

An Aggregated Network Load Indication policy can be implemented at the NAMS 100 at the SL on different nodes. The NAMS may obtain the underlying network load condition from different segments of the networks, for example, WiFi, ZigBee, and cellular networks. The NAMS may have different thresholds associated with network load conditions for different applications. By way of example, a load of 80% may be medium for a smart metering application, but high for a home security application. The NAMS 100 can pass such information to applications, and thus applications can make smarter decisions on its operations. For example, after the NAMS 100 determines that a segment of the network is highly loaded, for instance overloaded, an application may delay its transactions. As used herein, a load condition or status associated with a network may also be referred to as the network's congestion status.

Generally, the adaptation functions reduce the complexity of interfaces between different nodes or entities. For example, when the NAMS 100 generates input based on its policies, the input can be applied to multiple applications, networks, or other services. Therefore the Adaptation functions can dispatch the input to respective nodes. In some cases, when there are multiple inputs to the NAMS 100, the Adaptation functions may consolidate the input before sending the input to the 100 NAMS. Alternatively, the input may pass through to the NAMS 100 directly, based on the configuration. For example, the NAMS at an Infrastructure Node may receive input from NAMSs at Middle Nodes. The NAMS at the Infrastructure Node can indicate in its configuration message that it wants the input to be consolidated over a period of time.

As shown in FIGS. 7 and 8, the Service Adaptation function 108 and the Service Adaptation Service 710 interacts between the NAMS 100 and other services at the Service Layer. Other services may reside within the same Service Layer entity in the same node, or at a different Service Layers at a different node. The NAMS 100 may send input for one or multiple services, and the Service Adaptation function 108 or the Service Adaptation Service 710 can dispatch the input from NAMS 100 to different services.

The Application Adaptation Service 706 may assume a similar role as the Service Adaptation 710. The Application Adaptation Service 706 may interact with applications and the NAMS at the Service Layer. The NAMS at one node may interact with multiple applications. The NAMS 100 may generate input that applies to multiple applications and the Application Adaptation Service 706 can dispatch the input from the 100 NAMS to different applications. In some cases, when there are multiple reports from different applications to the NAMS 100, the Application Adaptation Service 706 may consolidate the reports before sending the consolidated reports to the NAMS 100. The Network Adaptation Service 708 interacts with the underlying networks and the NAMS 100 at the Service Layer. The Network Adaptation Service 708 consolidates input from one or multiple underlying networks to the NAMS 100, and it can dispatch input from the NAMS 100 to different underlying networks.

Figure 10:
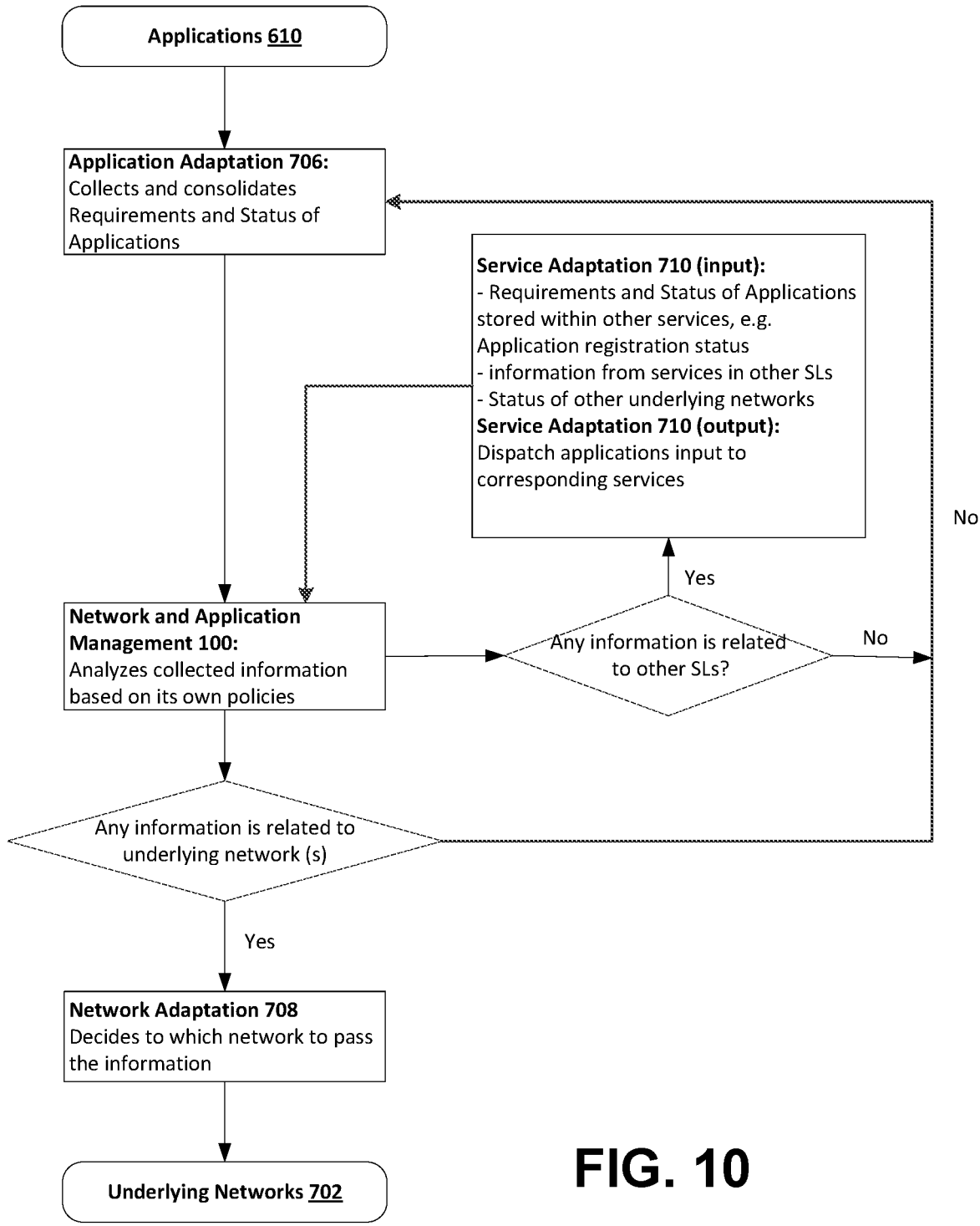
FIG. 10 is a flow diagram depicting a flow from applications to networks, showing example operations that can be performed by the NAMS and adaptation services associated therewith.
Figure 11:
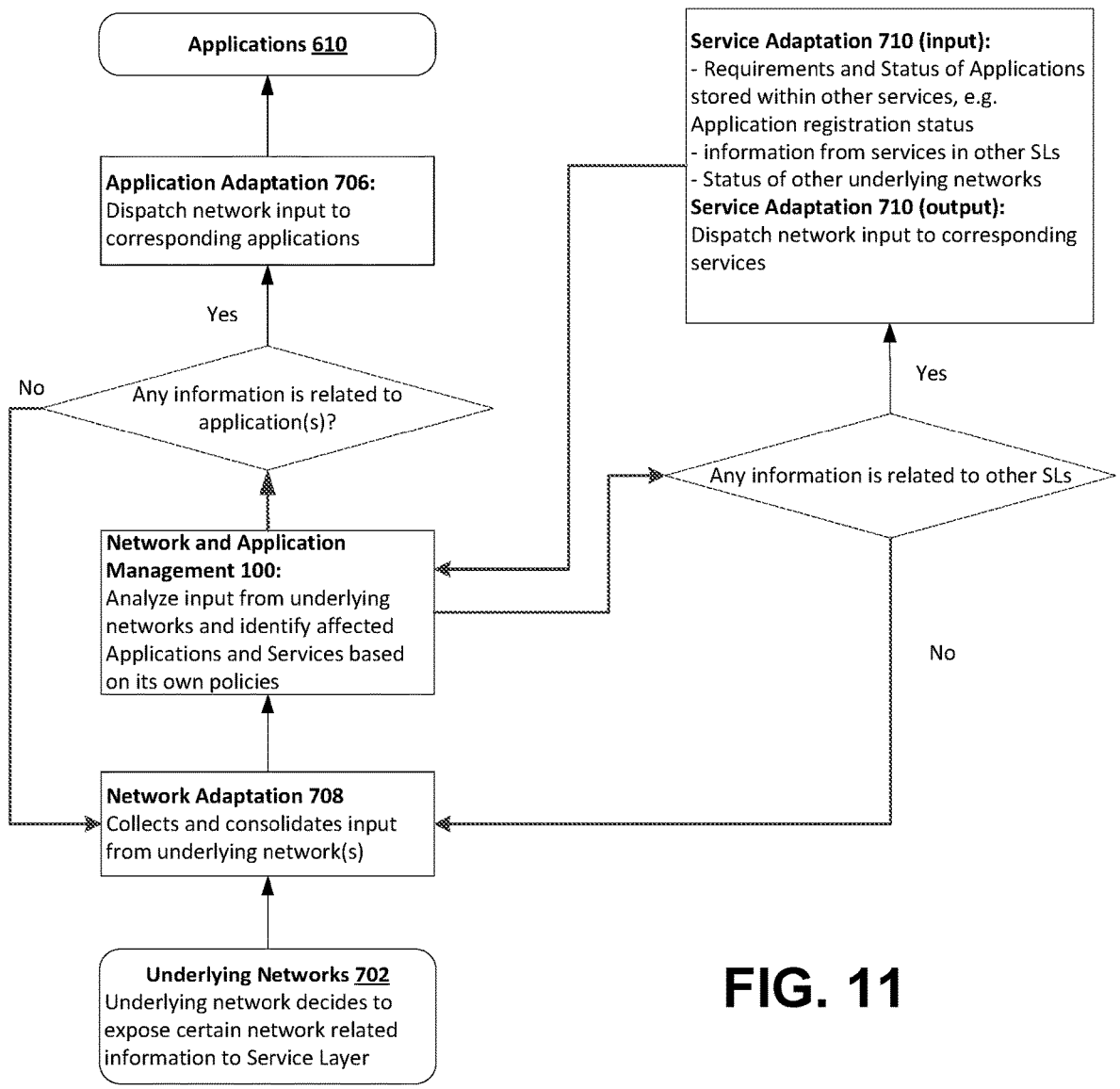
FIG. 11 is a flow diagram depicting a flow from networks to applications, showing example operations that can be performed by the NAMS and adaptation services associated therewith.

Referring also to FIGS. 10 and 11, operations mentioned above are further illustrated. For clarity and convenience, FIG. 10 depicts operations from applications 610 to networks 702 (a first direction), and FIG. 11 depicts operations from networks 702 to applications 610 (a second direction), though it will be understood that the operations in the first and second directions may occur simultaneously and may operate in parallel with each other. As shown, the NAMS 100 receives and sends output in both the first and second directions. Underlying network information can be exchanged by different Service Layers that reside on various networks. As shown, such information is exchanged between the Network Management and Service Adaptation functions over the inter Service Layer referent points. Further, the operations of the Service Adaptation function are divided into "input" and "output" because the function operates in both ways in FIGS. 10 and 11. "Input" refer to a transfer from Service Adaptation to Network Management, and "output" refers to a transfer from Service Adaptation to other SLs.

Table 1 below lists information elements that may be exchanged over different reference points based on the architecture and NAMS 100 functions described above. Note that the message names are for presented for convenience, so it will understood and that the messages can be identified by any other names as desired. The messages defined below are not specific to any syntax of any specific protocols, and thus the message can be realized by various protocols. For example, the messages can be realized by Request/Response using a RESTful method (e.g., HTTP or CoAP), Subscribe/Publish using MQTT, Request/Answer using Diameter, or the like.

The messages can be triggered by events and/or the message can be triggered periodically. Examples of triggering events are presented in Table 1, though it will be understood that other events may trigger messages as desired.

TABLE 1

Example NAMS Messages and Information over Reference Points

| Message Name | Reference Point | Direction | Information Elements (IE) | Triggering of the message | Operations of Recipient |
|---|---|---|---|---|---|
| NW Status Update | Mcn | Network to NAMS | Contains information that a network agrees to disclose to the SL. The NW Status update can include, without limitation: network name, type and ID; network data rate; QoS provided by the network; network load status (congestion status); network packet size; network transmission interval; maximum data per time unit; network's support of M2M devices; supported underlying network services, as discussed further below; network coverage (e.g., geographic coverage area); network's actions based on message "SL to NW Input". | Static network information can be passed to the SL during initial communication between the SL and the network; dynamic network information can be triggered when the network determines that such information should be passed to the SL; or it can be pulled by the SL using a "NW Status Query" message described below. | In an example, upon receiving the information in the NW Status Update, NAMS updates and stores the information for each underlying network; NAMS checks if the updates affect any applications and/or services, and if so, NAMS may initiate a "SL to App Input" message to the affected applications and/or "Service Layer Exchange" to other SLs. |
| NW Status Query | Mcn | NAMS to network | NAMS can query the underlying network, for example, for all or a subset of information mentioned in the above row. | SL may initiate a query to the underlying network upon initial communication; subsequent queries may be triggered by the change of SL, such as addition and deletion of services; or based on the change of applications that may have impact to the underlying network. NAMS makes the decision to send the query. | In an example, the underlying network fills the requested information in the "NW Status Update" message. |
| SL to NW Input | Mcn | NAMS to Network | Contains information that the Service Layer would like to pass to the underlying network. An SL to NW input can include, without limitation: individual or combined bandwidth requirement from applications | NAMS processes consolidated information and decides when to send the input to the network. Triggers can be changes on services and applications, such as requests that may have impacts to the underlying | In an example, the underlying network takes the input from the Service Layer, and can take actions to optimize its connections. Depending on the business agreement/relationship between the Service Layer and the underlying network, the underlying network |

TABLE 1-continued

Example NAMS Messages and Information over Reference Points

| Message Name | Reference Point | Direction | Information Elements (IE) | Triggering of the message | Operations of Recipient |
|---|---|---|---|---|---|
| | | | QoS required by applications transaction characteristics from applications, such as duration, continuous/bursty, etc. network management commands information from other services to be passed over Mcn, e.g., such as the condition of another underlying network. | network. | may make autonomous decisions based on input from the Service Layer, or it can act as the Service Layer requested. The underlying network may send the actions taken to SL using "NW Status Update." |
| NW to SL Query | Mcn | Network to NAMS | The underlying network can query the Service Layer, for example, for all or a subset of the information mentioned in the above row. | The query can be triggered based on the network's own decision, such as a need to obtain higher layer information to optimize network configurations. | In an example, the NAMS fills the requested information and sends the reply in SL to NW Input". The query may trigger NAMS to pull applications and other services or SLs to obtain relevant information. |
| SL to NW Config | Mcn | NAMS to network | In an example, the NAMS at the Service Layer sends configuration information to the underlying networks to indicate SL requested information; the actual Information Elements can be a subset of the IEs listed under message "NW Status Update" In addition, this message may also contain reporting configuration, such as periodical reporting, event triggered reporting, query based reporting, etc. | The trigger of this message can be an instantiation of the SL and initial setup between the SL and the underlying network, or based on any contract or agreement between the SL and the underlying networks. In an example, for any subsequent changes, the message can be used for the NAMS to initiate re-configuration. | In an example, the network can accept the configuration, or the network can negotiate the configuration using the "NW to SL Config" message. |
| NW to SL Config | Mcn | Network to NAMS | This message may be used for the network(s) to indicate to the SL what network specific information it can provide to the service layer. This message and the message "SL to NW Config" message can be used together for the NAMS and networks to negotiate what information can be | In an example, the trigger of this message can be the initial communication between the SL and the underlying network, or based on any contract or agreement between the SL and the underlying networks. For any subsequent changes, the | In an example, the SL can accept the configuration, or negotiate the configuration using the "SL to NW Config". message. |

TABLE 1-continued

Example NAMS Messages and Information over Reference Points

| Message Name | Reference Point | Direction | Information Elements (IE) | Triggering of the message | Operations of Recipient |
|---|---|---|---|---|---|
| | | | exchanged and how often the information can be exchanged between the SL and the underlying networks. | message can be used for the NW to initiate re-configuration. | |
| App Status Update | Mca | Applications to NAMS | In an example, applications push information to the Service Layer. The pushed information can include, without limitation: Application type, ID, name status (Active, Dormant, . . . ) application transmission rate amount of data transmission intervals application's actions based on message "SL to App Input". | In an example, the Applications decide when to initiate the message. It can be based on change of application transactions. | In an example, the NAMS analyzes the information it receives. It may generate input to the underlying networks. It may store the information for consolidation and further process with other collected information. |
| App Status Query | Mca | NAMS to Applications | In an example, the NAMS can query the Applications for all or a subset of the information mentioned in the above row. | In an example, the NAMS decides when to trigger the query, for example, when there are urgent network connectivity issues and the NAMS needs more recent status from applications. | The queried application(s) may fill the required information in the "App Status Update" message. |
| SL to App Input | Mca | NAMS to applications | In an example, this message contains information that the Service Layer would like to pass to the applications. The message can include, for example and without limitation: increase/decrease transmission rate increase/decrease duration increase/decrease total amount of data increase/decrease resolution transmit after X amount of time or after certain time application management commands switch network; may indicate candidate networks. | The SL may push the input to an individual application or a group of applications, for example, when the NAMS generated input may have impacts to such applications, e.g., such as if the input impacts how applications can transmit data. | In an example, the applications can take actions based on input from the NAMS in the SL. Depending on the ownership and business relationship of the applications and the service layer, the applications may take autonomous decision or act as requested by the service layer. |
| App to SL Query | Mca | Applications to NAMS | In an example, the applications can query the service | Applications may decide to query based on their | In an example, the service layer (NAMS) fills the requested |

TABLE 1-continued

Example NAMS Messages and Information over Reference Points

| Message Name | Reference Point | Direction | Information Elements (IE) | Triggering of the message | Operations of Recipient |
|---|---|---|---|---|---|
| | | | layer for all or a subset of the information mentioned in the above row. | own, for example, when the quality of communication has changed, or the application is about to change its pattern of communications (e.g., such as amount of data, request of rate, etc.) | information and sends back in "SL to App Input". |
| SL to App Config | Mca | NAMS to Applications | The NAMS can configure applications about what information the NAMS would like to obtain from the applications, This message can contain a subset of IEs from "App Status Update." | In an example, this message is triggered by NAMS initiation or subsequent changes of reporting policies. | The applications can accept the configuration and report what the SL requested for, or applications can negotiate by using the "App to SL Config" message. |
| App to SL Config | Mca | Applications to NAMS | Applications can configure NAMS about what information the applications would like to obtain from NAMS. This message can contain a subset of IEs from "SL to App Input." | In an example, this message is triggered when an application first registers to the SL, or due to subsequent changes. | In an example, the NAMS can accept the configuration or negotiate using the "SL to App Config" message. |
| SL Exchange | Mcc, Mcc', Mff | Between two services, or two Service Layers | My contains network management related information that two services or Service Layers can exchange. The message can include, without limitation: the network ID, type and name of the Service Layer resides Its own underlying network's condition as mentioned in the row for "Network Status Update" Its own applications information policies or output from NAMS | In an example, the SL decides when it pushes the information to another SL based on the change of information related to underlying networks, applications, or services. | The NAMS in the receiving service layer processes the information, and may decide to pass the information to applications or its underlying networks. In an example, if the exchanged information is the policy of NAMS, the receiving service layer can implement the policy in its own NAMS. If the exchanged information is the output of NAMS, the receiving service layer may take actions based on its own decision. For example, the receiving service layer may pass the bandwidth requirements to its underlying network |
| SL Query | Mcc, Mcc', Mff | Between two services, or two Service Layers | In an example, this message is used for NAMS in one service layer to query other services of the same service layer, or at different service layers. | In an example, this message is triggered when the NAMS needs to get more information from other services of the same service layer, or from another NAMS of a different service layer. | The recipient may provide the requested information and send it back in an "SL Exchange" message. |

TABLE 1-continued

Example NAMS Messages and Information over Reference Points

| Message Name | Reference Point | Direction | Information Elements (IE) | Triggering of the message | Operations of Recipient |
|---|---|---|---|---|---|
| SL to SL Config | Mcc, Mcc', Mff | Between two services, or two Service Layers | This message may be used between two services (via Mff) or two Service Layers (via Mcc or Mcc;) to configure and negotiate what information can be collected and exchanged between them. The information can be a subset of the "Service Layer Exchange" message. In addition, the message may contain reporting configuration. | In an example, the message can be initiated by any service, or Service Layer, upon initiation, or subsequent changes of reporting policies. | The recipient can accept the configuration. Or, by using the same type of message, the recipient can negotiate the configuration. |

Figure 12:
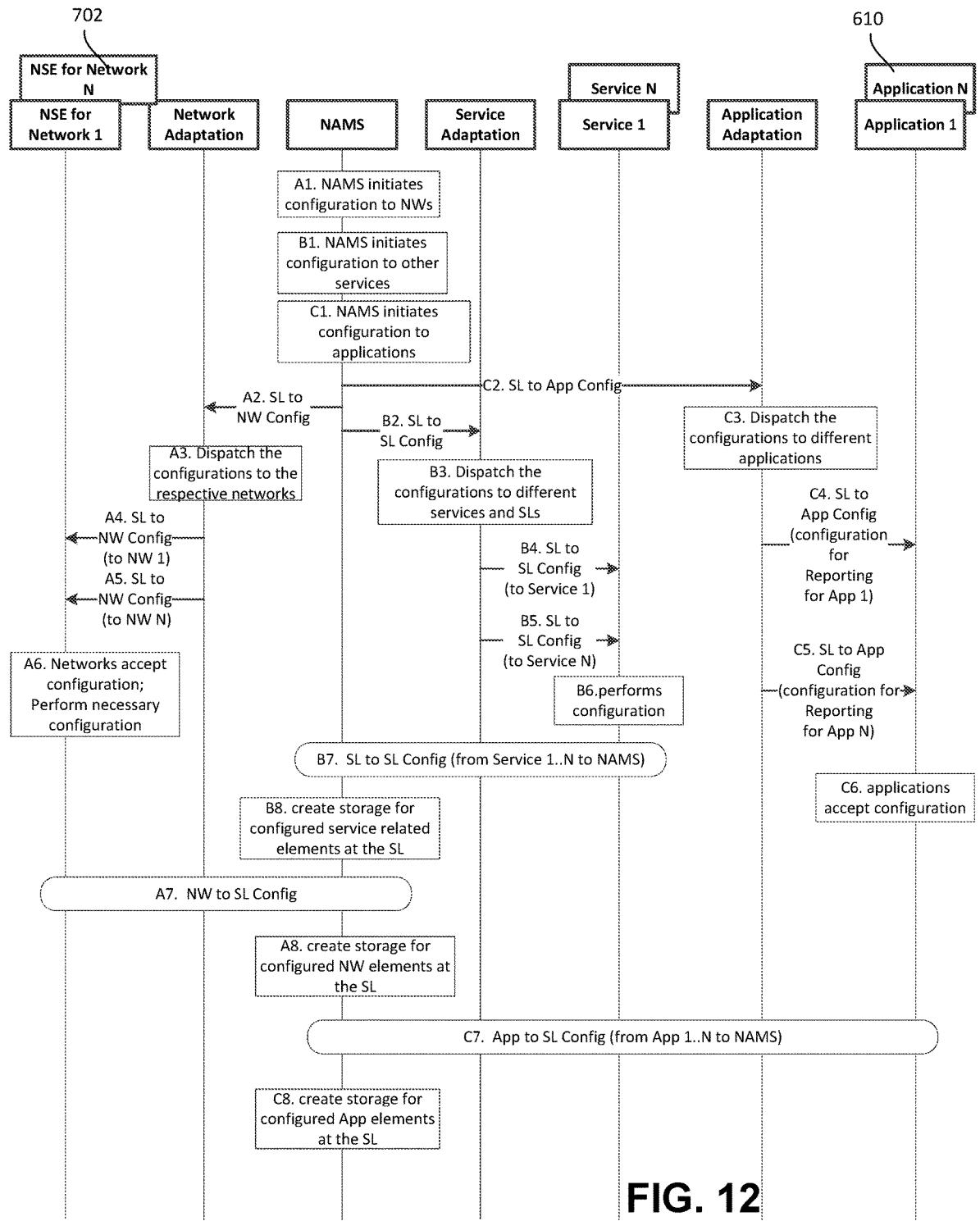
FIG. 12 is a call flow that shows the NAMS configuring applications, networks, and other services in accordance with an example embodiment.

The messages presented in Table 1 may be classified into three phases of operations. Some messages may be classified into a "configuration" phase. During an example configuration phase, the NAMS can configure the underlying networks, other services, and applications such that the networks, services, and applications are informed of what information the NAMS wants to collect. An example configuration phase is shown in FIG. 12. Furthermore, the underlying networks, services, and applications can indicate to NAMS what input that each of them would like to receive from the NAMS. Referring to FIG. 12, the example configuration messages are grouped into A, B, and C for clarity. In accordance with the illustrated embodiment, steps in the 'A' group are for configuration between the NAMS and underlying networks, steps in the 'B' group are for configuration between the NAMS and other services, and steps in the 'C' group are for configuration between the NAMS and applications. To reduce repetitions and for clarity, steps A7, B7, and C7 are shown as procedures.

Figure 13:
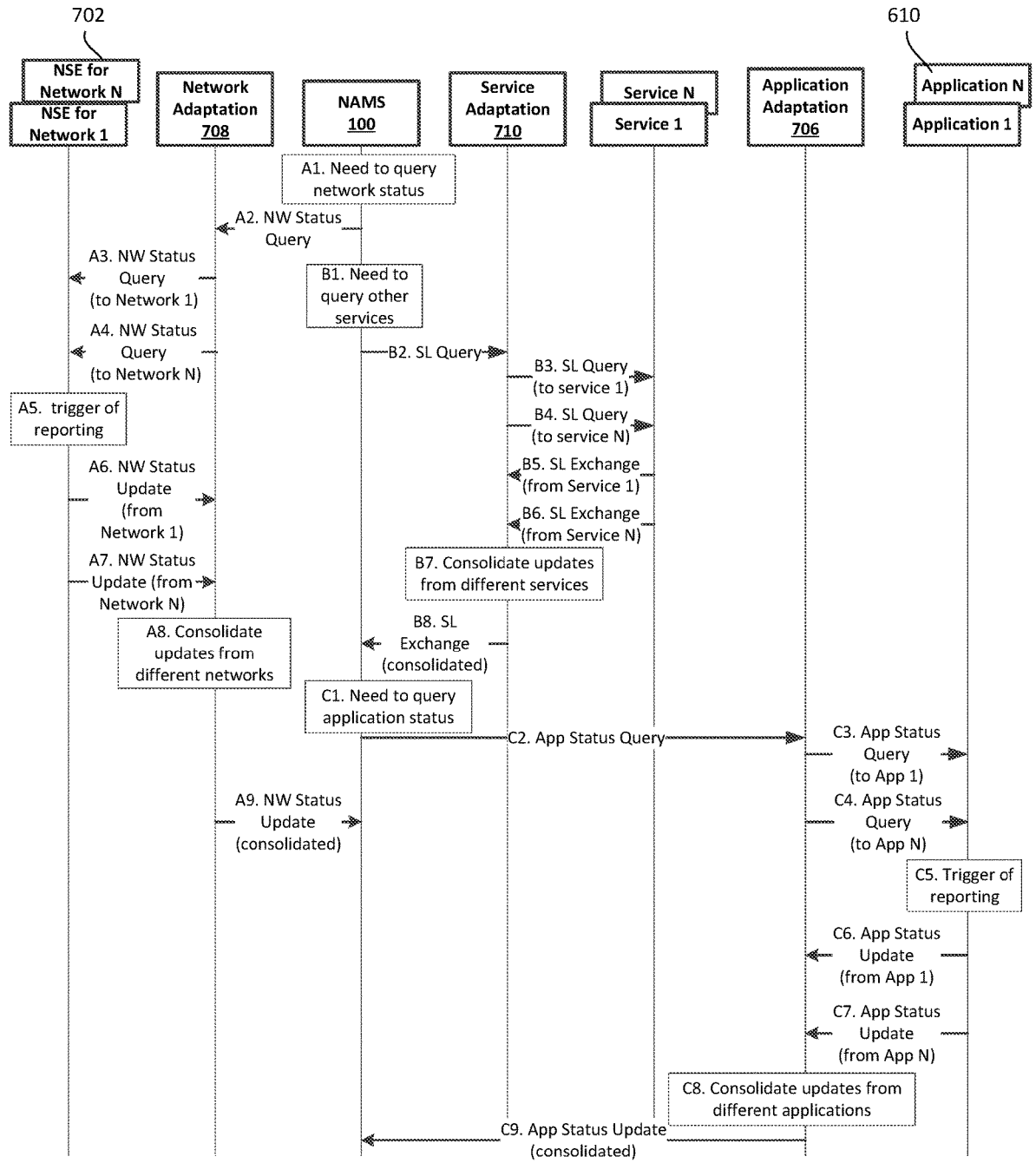
FIG. 13 is a call flow that shows the NAMS collecting various information from applications, networks, and other services in accordance with an example embodiment.

In an example embodiment, an information reporting and collecting phase follows the configuration phase. Referring to FIG. 13, in accordance with the illustrated embodiment, after configuration, the NAMS 100 can collect information from underlying networks, other services, and applications as desired. As shown, the messages are grouped into A, B, and C groups for networks, services, and applications, respectively. Although FIG. 13 shows a query message that is sent from the NAMS 100, to get the report, it will be understood that the networks 702, services, or applications 610 can additionally, or alternatively, push their reports to the NAMS 100, for example, based on the configuration.

Figure 14:
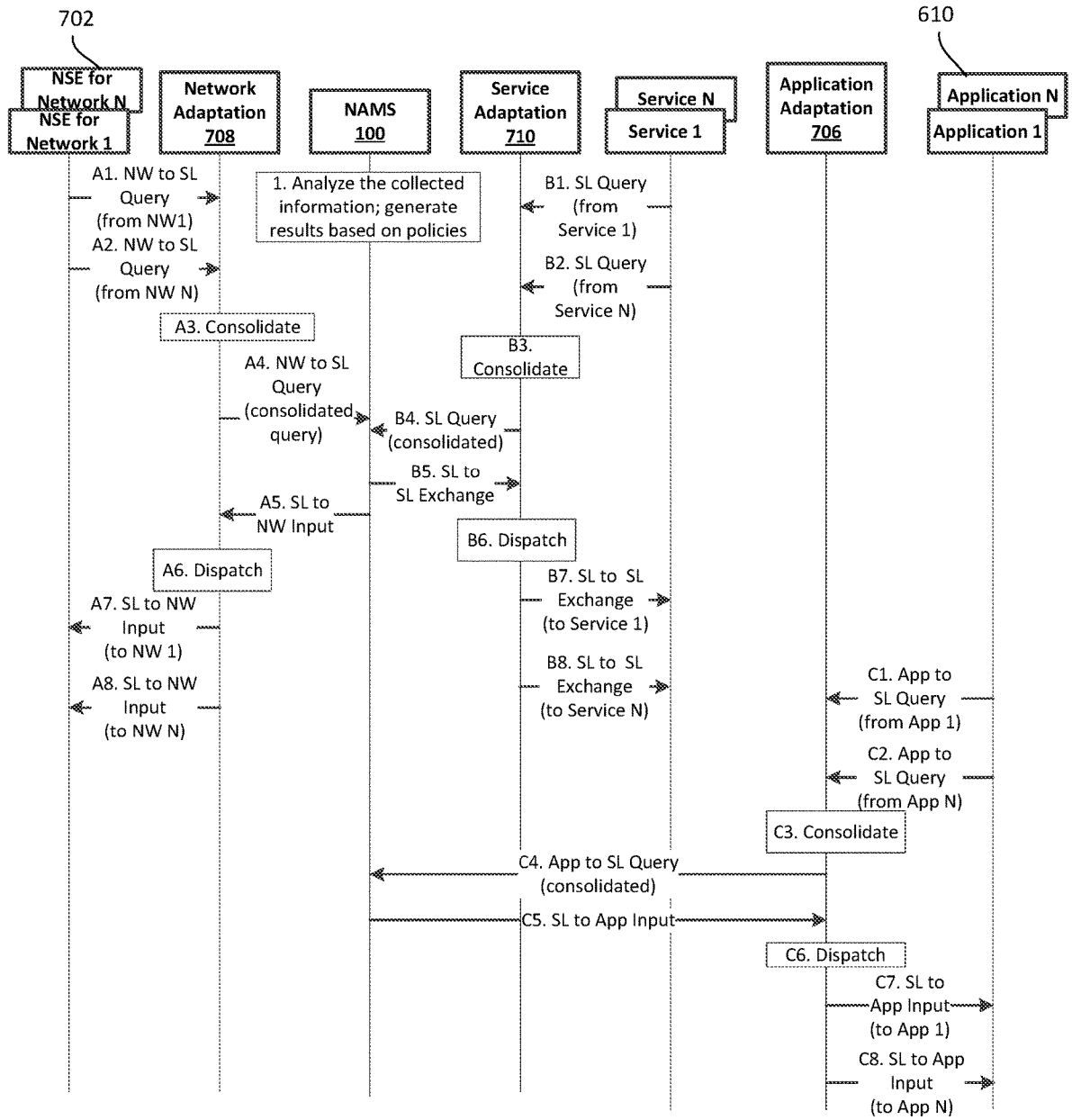
FIG. 14 is a call flow that shows the NAMS processing the collected information and generating input for applications, networks, and other services in accordance with an example embodiment.

For example, by way of summary of Table 1 and FIGS. 12-14, the NAMS can be implemented on an apparatus or node, and the various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably, unless otherwise specified.

Thus, the NAMS can be implemented on an apparatus or node that includes a processor, a memory, and communication circuitry. The apparatus may be connected to a communications network via its communication circuitry, and the apparatus may further include computer-executable instructions stored in the memory of the apparatus which, when executed by the processor of the apparatus, cause the apparatus to take action. For example, the apparatus may receive, via the communication network from a first node on the network, a first message (e.g., "NW Status Update" message) indicating at least one status update associated with the network. The apparatus may store the at least one status update associated with the network, and may determine whether the at least one update affects an application or a service. If the at least one update affects the application or the service, the apparatus may send to a second node that hosts the application or the service, a second message (e.g., "SL to App Input") indicating the at least one status update such that the application or service can take action based on the at least status one update. As shown in Table 1, the second message may further indicate, for example and without limitation, at least one of a change in a transmission rate of the application or service, a change in the transmission duration of the application or service, a change in a quantity of data associated with the application or service, a change in a resolution associated with the application or service, an instruction to transmit after a predetermined amount of time, an instruction to switch networks, or a second network to which the application or service can switch. As further shown in Table 1, the at least one status update may indicate, for example and without limitation, at least one a data rate associated with the network, a quality of service provided by the network, a congestion status associated with the network, a packet size associated with the network, a network transmission interval, a maximum data per time unit, one or more devices supported by the network, one or more services supported by the underlying network, or a geographic coverage of the network.

In an example embodiment, the apparatus (e.g., NAMS) may receive a first query (e.g., "App to SL Query" message) from the application or service, and the first message may be based on the first query. The apparatus may send a second query message (e.g., "NW Status Query" message) to the first node in response to receiving the first query message from the application or service, wherein the second query message may include a request for information associated with the network. Alternatively, or additionally, the apparatus may send the second query message to the first node such that the first message is received in response to the second query message. Thus, the apparatus (e.g., NAMS) my query the network at any time as desired for network-related information. For example, the NAMS may send a query that includes a request for information associated with the network, and the query may be sent in response to one or more services being added to or deleted from the service layer. In another example, the query may be sent based on a change in one or more applications connected to the network.

By way of further summary of Table 1 and FIGS. 12-14, the NAMS can be implemented on an apparatus, and the apparatus may receive, via a communication network from an application on the network, a first message (e.g., "App Status Update" message) indicating at least one update associated with the application. The apparatus may store the at least one update associated with the application. The apparatus may send to a first node on the network a second message (e.g., "SL to NW Input" message) indicating the at least one update such that the first node can take action based on the at least one update. Further, the apparatus may send to a first node on the network a second message (e.g., "SL to NW Input" message) indicating, for example and without limitation, at least one of a bandwidth requirement of the application, a quality of service requirement of the application, or a transaction characteristic of the application. The at least one update may indicate, for example and without limitation, at least one of a status associated with the application, a transmission rate associated with the application, a quantity of data associated with the application, a transmission interval associated with the application, an action taken by the application. The apparatus may receive a first query message (e.g., "NW to SL Query" message) from the first node, wherein the first message is based on the first query message. In example, the apparatus sends a second query message (e.g., "App Status Query" message) to the application in response to receiving the first query message from the first node. The second query message may include a request for information associated with the application. In another example, the apparatus sends a second query message (e.g., "App Status Query" message) to the application such that the first message is received in response to the second query message. In yet another example, the apparatus includes a service layer and the first query message is sent based on a connectivity issue associated with the network.

Referring now to FIG. 14 and Table 1, a third phase is depicted in which the NAMS 100 processes information and generates input. Although FIG. 14 shows that a query message may be sent to the NAMS 100 before the NAMS 100 responds with its input, it will be understood that the NAMS 100 may push its input without the query message. In accordance with the illustrated example, at 1, the NAMS 100 analyzes collected information (e.g., see FIG. 13), and generates results, which may be based on policies. At A1, a first network node, which can be referred to as a network service entity (NSE), of a first network sends a NW to SL Query message to the Network Adaptation Service 708. At A2, another network node, which can be also referred to as a NSE, of another network sends a NW to SL Query message to the Network Adaptation Service 708. At A3, in accordance with the illustrated example, the Network Adaptation Service 708 consolidates the query messages. At A4, the Network Adaptation Service 708 sends the consolidated query (NW to SL Query message) to the NAMS 100. At A5, the NAMS 100 sends an SL to NW input message to the Network Adaptation Service 708. At A6, the NAMS 100 dispatches the inputs. For example, at A7, the NAMS 100 sends an SL to NW Input message to the first network, and at A8, the NAMS 100 sends an SL to NW Input message to the other network.

Similarly, with continuing reference to FIG. 14 and Table 1, in accordance with the illustrated example, at B1, a first node that includes a first service sends a SL Query message to the Service Adaptation Service 710. At B2, another node that includes another service, sends a SL Query message to the Service Adaptation Service 710. At B3, in accordance with the illustrated example, the Service Adaptation Service 710 consolidates the SL query messages. At B4, the Service Adaptation Service 710 sends the consolidated query (SL Query message) to the NAMS 100. At B5, the NAMS 100 sends an SL to SL Exchange message to the Service Adaptation Service 710. At B6, the NAMS 100 dispatches the inputs. For example, at B7, the NAMS 100 sends an SL to SL Exchange message to the first service, and at B8, the NAMS 100 sends an SL to SL Exchange message to the other service.

Still referring to Table 1 and the illustrated example of FIG. 14, at C1, a first application sends an App to SL Query message to the Application Adaptation Service 706. At C2, another application sends an App to SL Query message to the Application Adaptation Service 706. At C3, in accordance with the illustrated example, the Application Adaptation Service 706 consolidates the App to SL query messages. At C4, the Application Adaptation Service 706 sends the consolidated query (App to SL Query message) to the NAMS 100. At C5, the NAMS 100 sends an SL to App input message to the Application Adaptation Service 706. At C6, the NAMS 100 dispatches the inputs. For example, at C7, the NAMS 100 sends an SL to App Input message to the first application, and at C8, the NAMS 100 sends an SL to App Input message to the other application.

Turning now to example use case scenarios using the NAMS, the NAMS 100 can enable network optimization and application optimization. A first example use case is depicted in FIG. 15, which illustrates an example service layer assisted network optimization.

Figure 15:
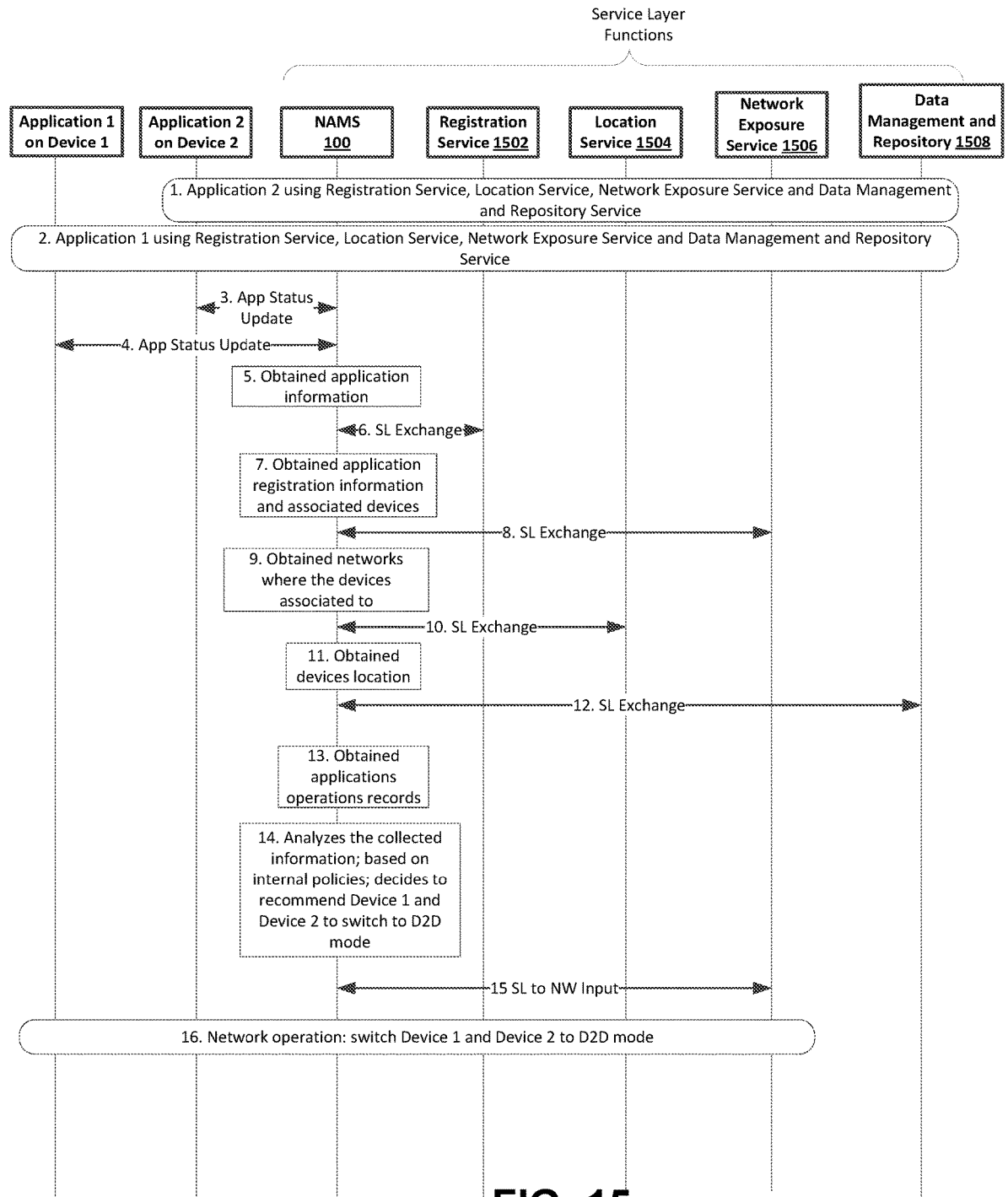
FIG. 15 is a flow that illustrates an example of service layer assisted network optimization in accordance with an example embodiment.

Referring to FIG. 15, in accordance with the illustrated example, two applications, application 1 running on device 1 and application 2 running on device 2, are registered to a Service Layer in a network node. As shown, other services, which can also be referred to as service layer functions, provided by the service layer on the network node include a registration service 1502, a location service 1504, a network exposure service 1506, and a data management and repository 1508. The NAMS 100 in the network node collects information from the applications and other services, and makes a recommendation based on its policy to switch device 1 and device 2 into device-to-device (D2D), which can also be referred to as peer-to-peer (P2P) communication mode, for example, to optimize the communication.

Still referring to FIG. 15, in accordance with the illustrated example use case, at 1, Application 2 registers to the Service Layer in the network node using the registration service 1502. At 2, Application 1 registers to the Service Layer in the network node. Thus, the applications may use other existing services at the Service Layer, such as the illustrated services including the location service 1504 and the data management and repository service 1508 as already defined in the current Service Layer. At 3, the NAMS 100 retrieves information associated with Application 1 using an "App Status Update" message. At 4, the NAMS 100 retrieves information associated with Application 2 using an "App Status Update" message. The retrieved information may include various application related information, such as, for example, a type of the application, a duration of the transaction, or the like. It will be understood that the NAMS 100 may pull such information using an "App Status Query" message, which is not shown in FIG. 15 for simplicity. Example App Status Update and App Status Query messages are described in the aforementioned Table 1. Based on the information associated with the applications, in accordance with the illustrated example, the NAMS 100 determines that the transactions between the Application 1 and Application 2 have long durations and include large volumes of data. At 6 and 7, the NAMS 100 receives Service Layer registration information from the registration service 1502. For example, as shown, the NAMS 100 receives registration information that indicates that Application 1 is on Device 1, Application 2 is on Device 2, and Applications 1 and 2 are registered to the same Service Layer. At 8 and 9, the NAMS 100 determines, from the network exposure service 1506, that the network with which Device 1 and Device 2 are connected is experiencing a traffic overload issue. In accordance with the illustrated example, at 10 and 11, the NAMS 100 may determine the location of Device 1 and Device 2, and thus the locations of Application 1 and Application 2, by obtaining information from the location service 1504 at the Service Layer. Thus, the NAMS 100 may determine that two or more devices, for instance Device 1 and Device 2, are in proximity with each other.

With continuing reference to FIG. 15, at 12 and 13, in accordance with the illustrated example, the NAMS 100 can retrieve transaction records from the Data Management and Repository Service 1508. Based on the records, for example, the NAMS 100 may determine that Application 1 and Application 2 communicate with each other. At 14, based on the retrieved information described above, for example, the NAMS 100 may triggers its own decision making logic based on its internal policy. Thus, the NAMS 100 can determine that Device 1 and Device 2 can switch to a D2D connection mode. At 15, in accordance with the illustrated example, the NAMS 100 may sends results it generates to the Network Exposure Service 1506. The Network results may indicate that D2D is a more optimized connection mode for Device 1 and Device 2 as compared to the previous connection mode, for example Device 1 and Device 2 being connected with each other via the underlying network. The service layer may also choose to pass information related to the decision making to the underlying network, if such information is allowed to be exposed for example. The Network Exposure Service 1506 may pass the information to the underlying network via the Mcn reference point. At 16, in accordance with the illustrated example, the underlying network receives the recommendation from the Service Layer. The network may also check its own information, such as the subscriber contracts of Device 1 and Device 2, network statistics, or the like. Based on the recommendation and/or based on the network's own information, the network may determine whether to switch the devices (e.g., Device 1 and Device 2) to D2D mode. The underlying network may trigger its own procedures to switch the mode of the devices.

In another example use case scenario of a service layer assisted network optimization, using the application related information that is obtained from the NAMS 100 on the Service Layer, a given network can offload applications to different access networks. By way of example, the NAMS 100 may determine that there are a large number of applications running over the same underlying network, and that the applications transmit a large amount of data. The NAMS 100 may also determine available underlying networks and network load (e.g., congestion) information associated therewith from another service (e.g., network exposure service 1506). In some cases, the NAMS 100 makes a recommendation that one or more applications should run on a different underlying network, which may have the same network operator as the network on which the one or more applications currently run. The NAMS 100 may send the input (recommendation) to the one or more applications and/or the underlying network. Either an application or the network may initiate the action to transfer the network on which the application runs.

In yet example use case scenario of a service layer assisted network optimization, using information from other networks that is received via the Service Layer, a given network can adjust its coverage, for example, for power control purposes. By way of example, suppose two Middle Nodes (e.g., wireless gateways) reside on two different area networks. Using the power or signal strength information obtained from the Service Layer within each Middle Node, the NAMS 100 can generate output to indicate that the middle node may want to reduce its transmission power. The NAMS 100 can passes such information via Mcn to the network stack. Based at least in part on the information received from the NAMS 100, a given network may choose to adjust its power.

Figure 16:
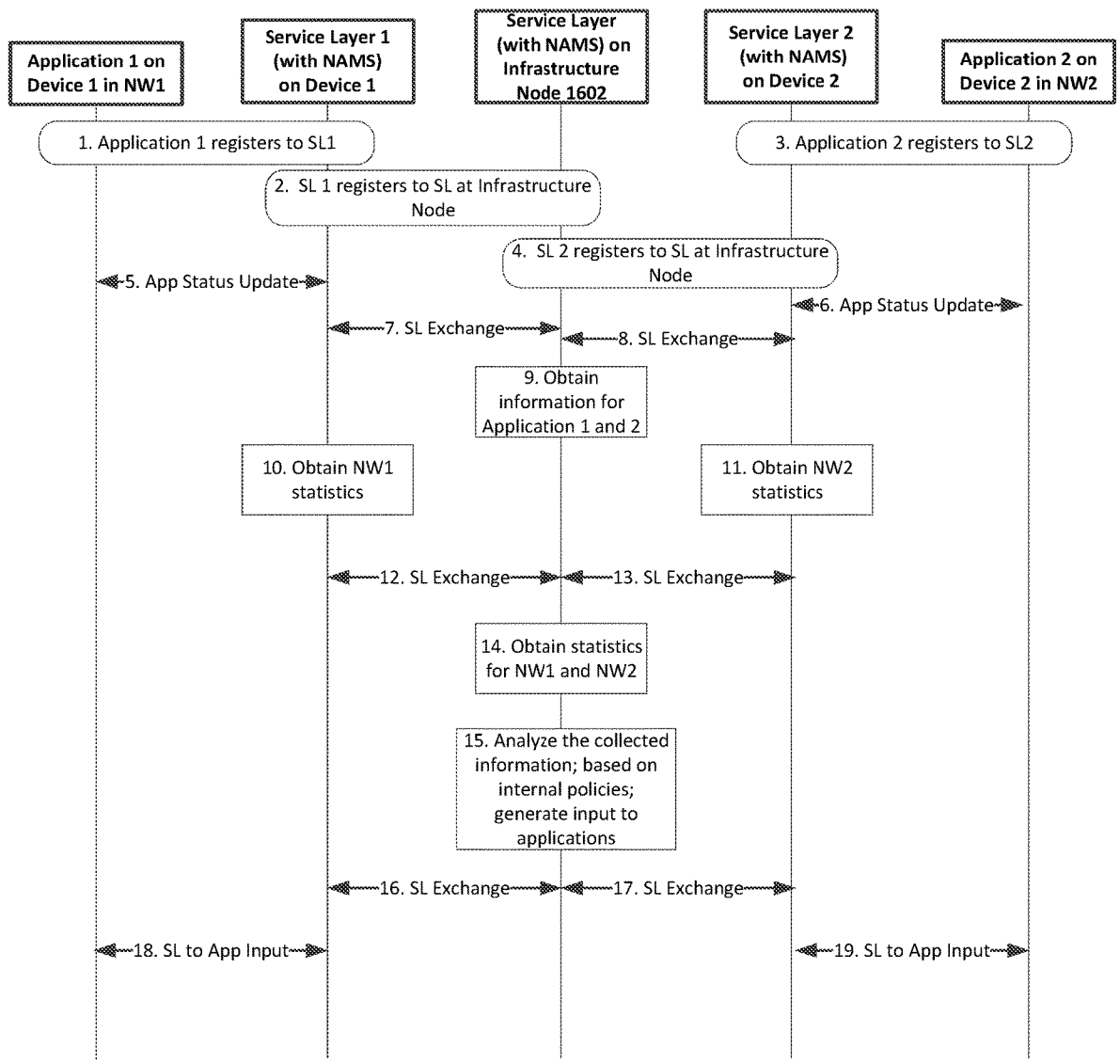
FIG. 16 is a flow that illustrates an example of service layer assisted application optimization in accordance with an example embodiment.

Referring now to FIG. 16, an example use case is shown that illustrates an example service layer assisted application optimization. In the illustrated example, at 1, a first application (Application 1) on a first device (Device 1) that is connected to a first network (NW1) registers to a first Service Layer (Service Layer 1). At 3, a second application (Application 2) on a second device (Device 2) that is connected to a second network (NW2) registers to a second Service Layer (Service Layer 2). At 2 and 4, the first and second Service Layers, respectively, on the respective devices also register to a Service Layer at an Infrastructure Node 1602. Each of the service layers include a NAMS 100. In accordance with the illustrated example, at 5 and 6, Applications 1 and 2 report their information to Service Layer 1 and Service Layer 2, respectively, using an "App Status Update" message. Thus, applications may report information to service layers to which they are registered. Reported information may include, for example and without limitation, a type of the application, a quantity of data that the application transmits, of the like. It will be understood that the SL, and in particular the NAMS 100, may pull such information using an "App Status Query" message, which is not shown in FIG. 16 for simplicity. At 7 and 8, the Service Layer 1 at Device 1 and the Service Layer 2 at Device 2 can further report such information to the SL at the Infrastructure Node 1602, for example, using an "SL Exchange" message. Thus, at 9, the Service Layer at the Infrastructure Node 1602 obtains information associated with Application 1 and Application 2.

Still referring to FIG. 16, at 10, the Service Layer 1, and in particular the NAMS 100 at Service Layer 1 (SL1), obtains statistics associated with underlying network 1 (NW1) via the Network Exposure Service 1506. Similarly, at 11, the Service Layer 2, and in particular the NAMS 100 at Service Layer 2 (SL2), obtains statistics associated with underlying network 2 (NW2) via the Network Exposer Service 1506. At 12 and 13, because the Service Layers on device 1 and device 2 are registered to the Service Layer at the Infrastructure Node 1602, the Service Layer at the Infrastructure Node 1602 receives the statistics via "SL Exchange" messages. Thus, at 14, statistics associated with NW1 and NW2 are obtained by the SL at the Infrastructure Node 1602. At 15, in accordance with the illustrated example, the NAMS 100 at the Infrastructure Node 1602 analyzes the collected information, and makes decision based on policies of the NAMS 100. By way example, the NAMS 100 at the Infrastructure Node 1602 can provide an indication that Applications 1 and 2 should be allotted a lower bandwidth. By way of another example, the NAMS 100 at the Infrastructure node 1602 may indicate that the applications delay transmissions, for example, if a given network connectivity issue is temporary. As shown, such indications may be sent to the NAMS 100 at device 1 and device 2 via "SL Exchange" messages at 16 and 17, and the NAMS at the devices may send the indications to the respective applications via the "SL to App Input" message at 18 and 19. Example SL Exchange messages and SL to App Input message are described above in Table 1.

In another example use case scenario of a service layer assisted application optimization, the NAMS 100 can facilitate management between two or more applications. For example, an application (the administrator application) can manage one or more other applications. The administrator application can pass its policy to the NAMS 100, for example, to trigger one or more applications to switch to a particular underlying network when a predetermined threshold (condition) is met. The NAMS 100 can collect required input, and when the condition is met, the NAMS 100 may send triggers on behalf of the administrator application to the one or more applications.

Figure 17:
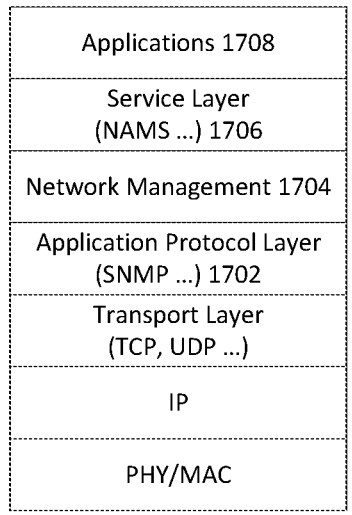
FIG. 17 is an example protocol stack that shows the NAMS at a service layer.

Referring now to FIG. 17, as described above, the NAMS 100 at the Service Layer can work independently, or may work together with existing network management mechanisms to complement such mechanisms. FIG. 17 shows a protocol stack 1700 of example layers. SNMP is an example protocol used in an Application Protocol Layer 1702. Above the Application Protocol Layer 1702, networks may have network management functions, which can also be referred to generally as a network management layer 1704. As shown, a Service Layer 1706 resides above the Application Protocol Layer 1702 and the Network Layer 1704, just below Applications 1708. The Service Layer 1706 may interact with the Network Management Layer 1704 to obtain underlying network information, such as information contained in the messages and information exchanges over Mcn described above. Some transport protocols, such as TCP for example, also have the capability to adapt their transmission rates. Such protocols are reactive, while the herein described NAMS 100 can prevent various situations, thus increasing overall performance as compared to existing protocols.

The Service Layer 1706 may receive information from SNMP, and SNMP can be used for the Mcn reference point to interact with the Service Layer 1706. SNMP can still perform its existing functions, such as network device management for example.

As mentioned above, the NAMS 100 can generate input to underlying network based on its own aggregated information and policies. Thus, underlying networks may take actions based on different sources of input, for example, such as the NAMS 100 and existing network management functions.

Figure 18:
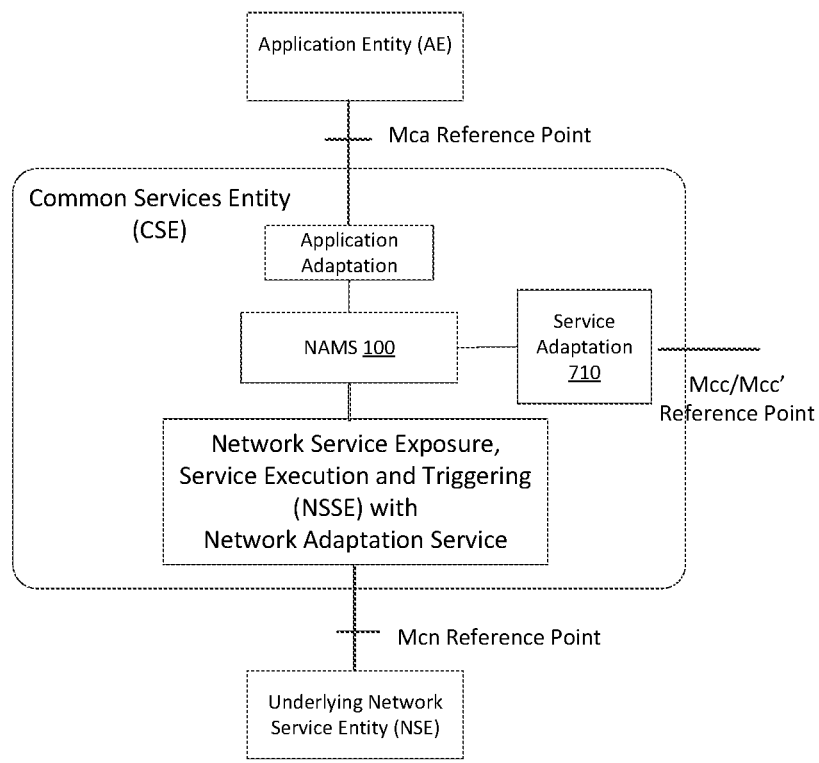
FIG. 18 shows an example of how the NAMS can fit into an oneM2M resource-oriented architecture (RoA)

In accordance with an example embodiment, referring to FIG. 18, the NAMS 100 and the above-described adaptation functions fit into a oneM2M RoA Architecture. In accordance with the illustrated embodiment, the NAMS 100 is a new Common Service Function (CSF). As shown, the Network Adaptation Service 708 can be part of the NSSE CSF. As further shown, the Application Adaptation Service 706 and Service Adaptation 710 are external to any CSFs. In an alternative embodiment, the NAMS 100 may be part of the NSSE.

Figure 19A:
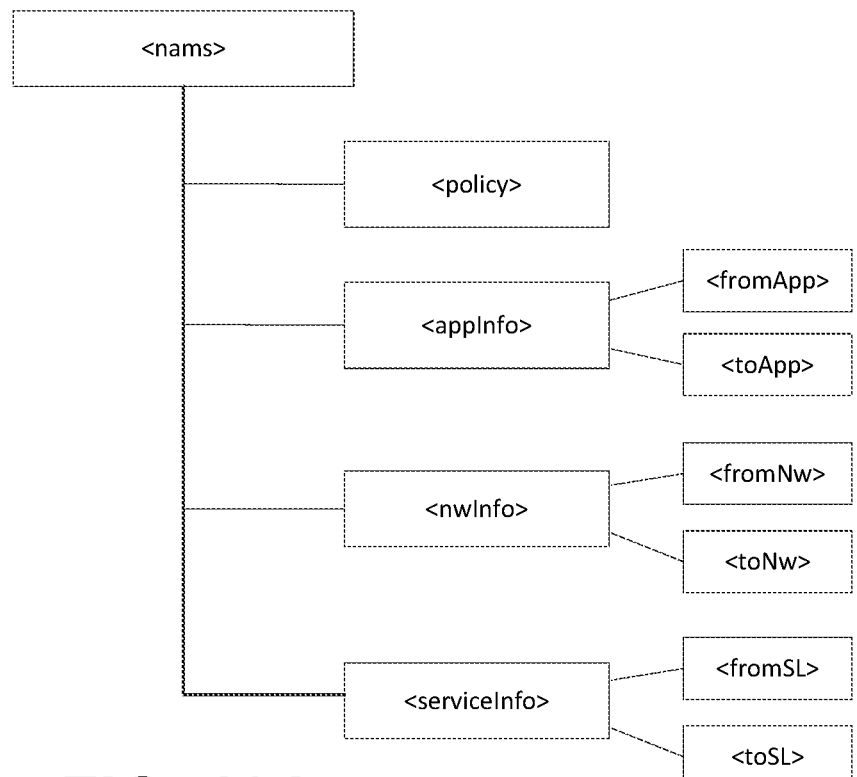
FIGS. 19A and 19B each show an example resource structure that can be used by the NAMS.
Figure 19B:
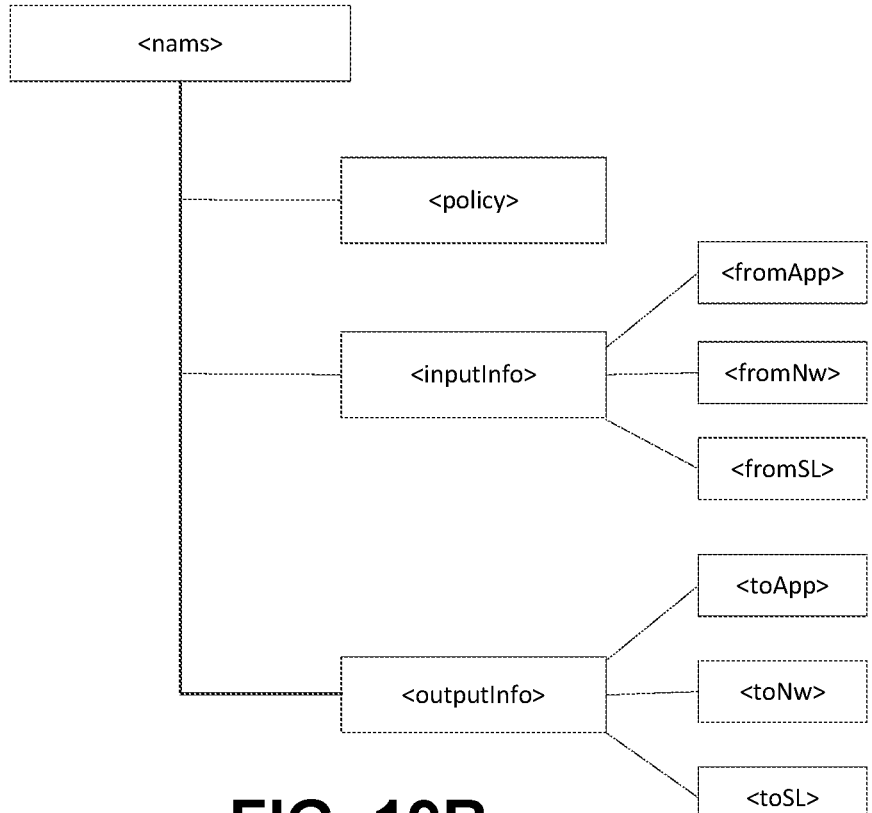

Referring now to FIGS. 19A and 19B, two example alternative resource structures are shown to support the NAMS functions described herein. The resource structures include input from applications, underlying networks, and other service layers. The NAMS 100 can use the input to process the information and generate output. The example information exchange (IE) messages described in Table 1 above can be stored in the resources illustrated in FIGS. 19A and 19B. For example, the NAMS 100 can store local policies or links to external policies in a <policy> resource. Policies can be added, deleted, or updated by operating the <policy> resource. Table 2 below shows an example of how a <policy> structure can be defined in accordance with an example embodiment.

Referring to Table 2 and FIGS. 19A-B, NAMS 100 at the SL may determine what information it can send to applications, networks, and other services. In an example, a subset of the information described in Table 1 can be stored under <toApp>, <toNw> and <toSL>. For example, the information exchanges (IEs) in the message "SL to NW Input" can be stored under <toNw>.

In an example, the input from applications, networks, and other services are stored under <fromApp>, <fromNw>, and <fromSL>, respectively. Which information can be stored under each resource can be based on the configuration of the NAMS 100, and based on negotiations between the NAMS 100 and other nodes, for example, using the "config" messages described in Table 1. For example, the information exchanged in the message "NW Status Update" can be stored under <fromNw>. Each network can be differentiated from each other by a unique ID associated with each network.

TABLE 2

Example Attributes of the "policy" Resource

| Attribute Name | Description |
| --- | --- |
| policyID | This is the unique ID of each policy |
| policyName | This is the name of the policy |
| description | This is the text to describe the policy |
| label | This is the key word that is searchable for a policy. Policies can be categorized into different groups and searchable by the group key words. For example, "QoS", "bandwidth". |
| externalPolicy | This is a link to an external policy outside of NAMS, for example, an URI to the external policy, The following attributes may not be needed for an external policy since details of the policy can be defined there. |
| namsPolicy | This is a pointer to the function of the policy. This is a function supported by the SL software. |
| input | This is the list of input parameters of this policy |
| output | This is the output of this policy. |
| creationTime | The time stamp indicating when the policy was created. |
| expirationTime | The time stamp indicating when the policy should expire. A policy can be permanent and will not expire unless deleted. |
| applicability | Indicates a list of entities that this policy applies. Each entity is identified by their unique IDs, such as application ID, CSE-ID and Network ID. |

Figure 20:
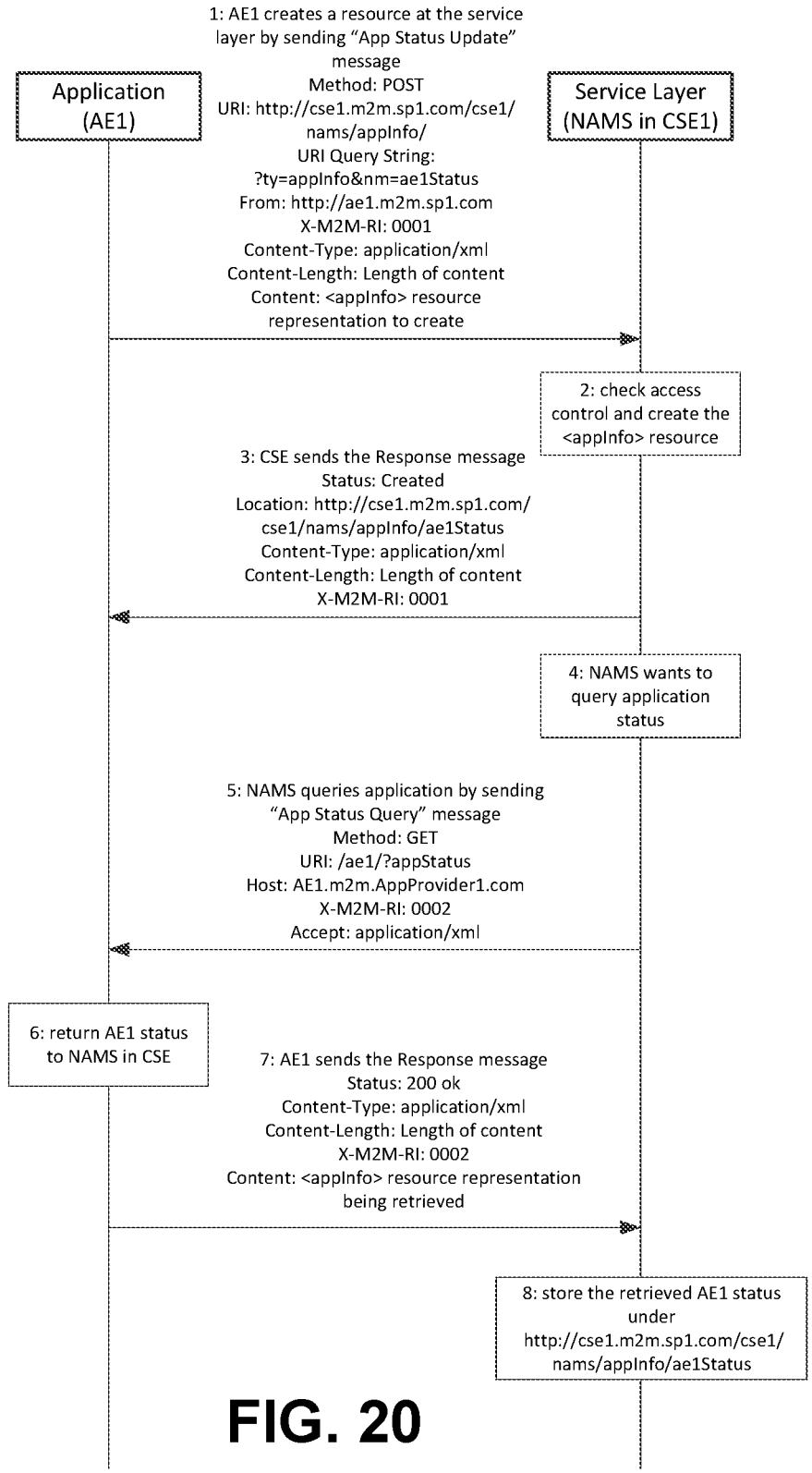
FIG. 20 is a call flow that shows example messages exchanged between the NAMS and an application entity using the HTTP protocol and the resource structure shown in FIG. 19A.

Referring now to FIG. 20, an example call flow using the HTTP protocol and the resource structure shown in FIG.

19A is shown. As further described below, at 1 through 3, FIG. 20 illustrates an example of how the "App Status Update" defined in Table 1 can be performed using the HTTP protocol. Steps 4 to Step 8 show an example "App Status Query" operation.

Still referring to FIG. 20, in accordance with the illustrated embodiment, at 1, an application entity (AE1) sends an "App Status Update" message to the NAMS 100 in the service layer, which can also be referred to as the common services entity (CSE) without limitation, by initiating a HTTP POST request. The illustrated CSE can also be referred to as CSE1. In the request, AE1 indicates the destination URI where its resource should be created. In this example, it is stored under http://csel.m2 m.spl.com/csel/nams/appInfo/fromApp/. AE1 also indicates that the resource type should be "appInfo" resource and that the resource name is ae1Status. It will be understood that although the illustrated example shows one way to structure the resource, the resource can be structured alternatively as desired. In the illustrated example, the resources for different AE statuses are stored directly under <appInfo>. In an alternative example, the CSE1 can use <fromApp> as a collection and store all AE status resources under /appInfo/fromApp. As shown, AE1 includes the request ID 0001 in the message, and indicates the content format and content length in the message. In the payload, AE1 may include the resource representation for the AE status update. At 2, upon receiving the request, the CSE1 verifies the access right of the creator, and if allowed to create the resource, the CSE1 creates the resource for AE1 status. At 3, in accordance with the illustrated example, after successfully creating the resource, the CSE sends the HTTP response message, which includes the URI of the resource and the status of the operation.

With continuing reference to FIG. 20, at 4, the NAMS 100 at the CSE1 decides to query the application status. This does not need to occur immediately after the preceding steps, but may occur at a certain time during the illustrated operations. At 5, the CSE sends the "App Status Query" message using the HTTP GET request, to AE1. Note that this operation indicates that the AE can be a HTTP server and requests that the AE stores its own status locally for retrieval. At 6, AE1 decides to return its status to the CSE1. At 7, AE1 returns its status in the resource representation of <appInfo>. At 8, the CSE1 stores the retrieved AE1 status under the location in its resource structure.

Figure 21:
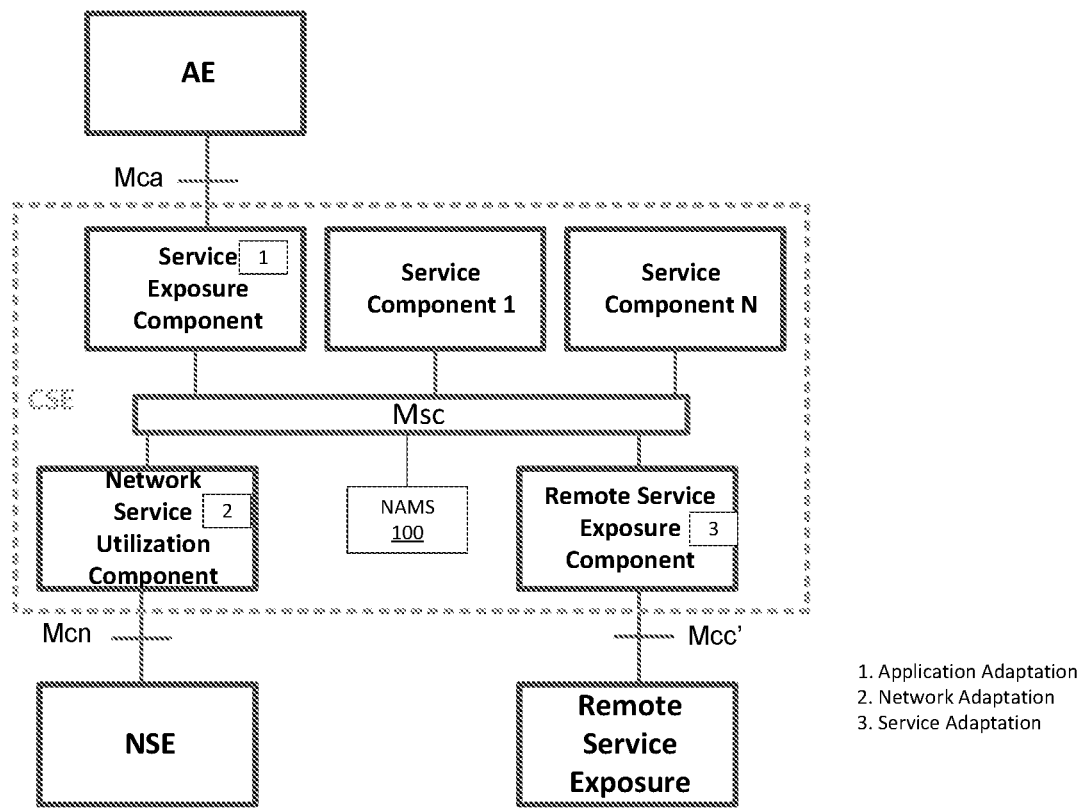
FIG. 21 shows an example of how the NAMS and functions related thereto can fit into an oneM2M service-oriented architecture (SoA)

Referring now to FIG. 21, an example of how the functions of the NAMS 100 described herein can apply to an oneM2M SoA architecture is shown. In an example, the NAMS 100 can be defined as an independent new service, as shown in the FIG. 21. The adaptation functions, shown as boxes 1, 2, and 3, can be part of the existing service exposure components. The interactions between the services over the Mff reference points can be achieved by the Msc reference point. It will be understood that the messages and information exchanges described above can apply to the SoA architecture as well.

Figure 22:
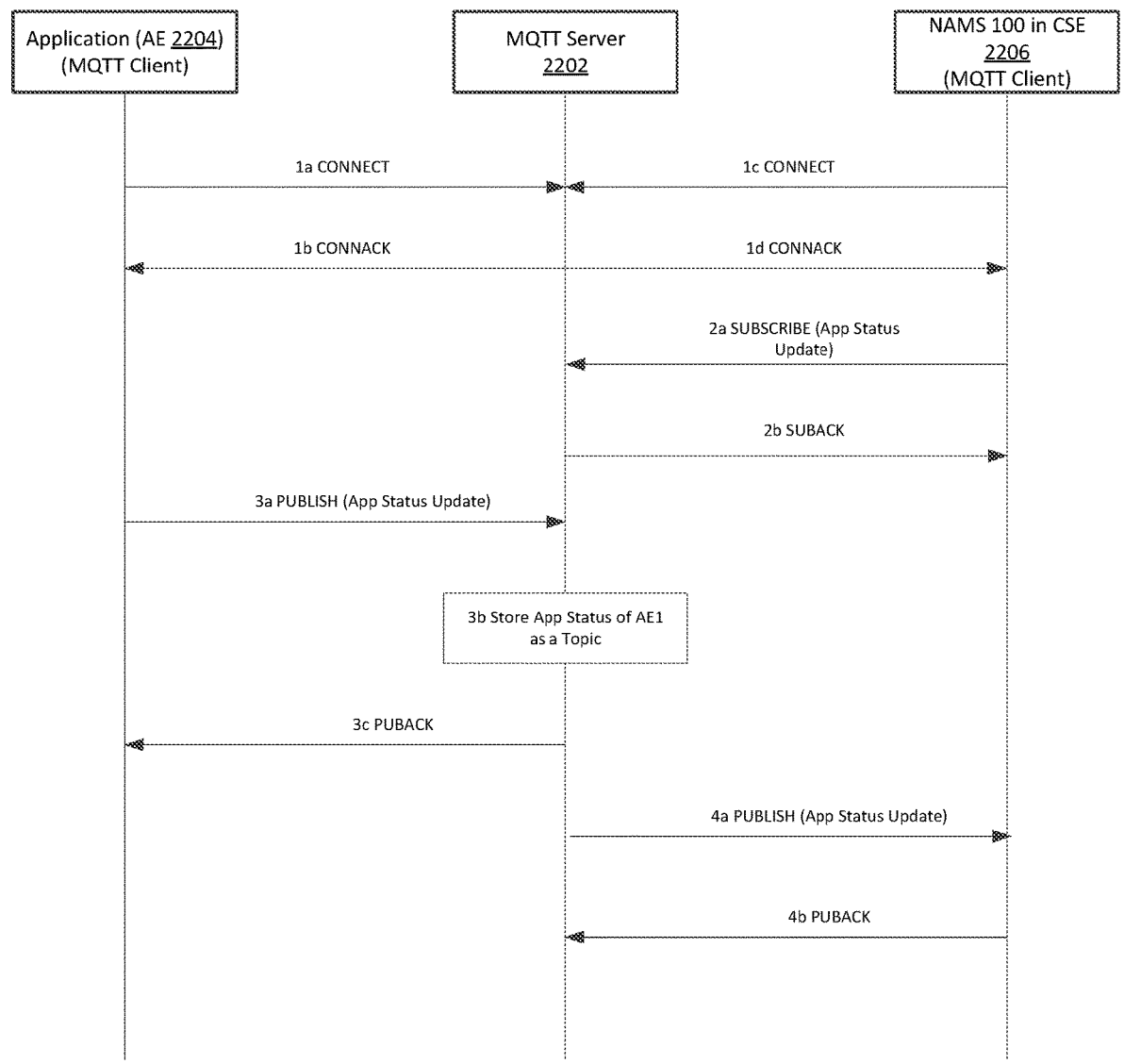
FIG. 22 is a call flow that shows example messages exchanged between the NAMS, a server, and a client using the MQTT protocol in accordance with an example embodiment.

Referring to FIG. 22, an example call flow using the MQTT protocol to achieve the messages described above is shown. The illustrated call flow illustrates an example of how MQTT can be used to support "App Status Update" and "App Status Query." FIG. 22 shows an MQTT server 2202, which can be an external server or can be embedded in a service layer entity. In the illustrated example, the MQTT server 2202 is shown as an external entity for clarity. The illustrated AE 2204 and CSE 2206 are MQTT clients. Referring to 1a to 1d, prior to service layer related operations, the AE 2204 and CSE 2206 connect to the MQTT server 2202 using the MQTT CONNECT message. The MQTT server 2202 obtains the identifier and address of the AE(s) and CSE(s) connected to it. At 2a and 2b, in accordance with the illustrated example, the NAMS 100 at the service layer triggers the MQTT SUBSCRIBE message. In the message, the NAMS 100 includes that it is interested in the MQTT Topic of "App Status Update". The NAMS 100 can indicate the specific identifier of the AEs to which it is interested. This may be equivalent to the "App Status Query" described in Table 1. At 3a to 3c, in accordance with the illustrated example, the AE 2204 publishes its own status updates using the MQTT PUBLISH message. The message contains the status update information in the message payload. Upon receiving the message, the MQTT server 2202 may store the information in its Topic list. Information associated with the application status is described in Table 1. At 4a to 4b, because the NAMS 100 subscribed to the Topic of AE1 status update, the MQTT server 2202 will send notifications to the NAMS 100 by using the MQTT PUBLISH message. The MQTT server 2202 may put the AE 2204 status update in the payload of the PUBLISH message that it sends to the NAMS 100 at the CSE 2206.

Figure 23:
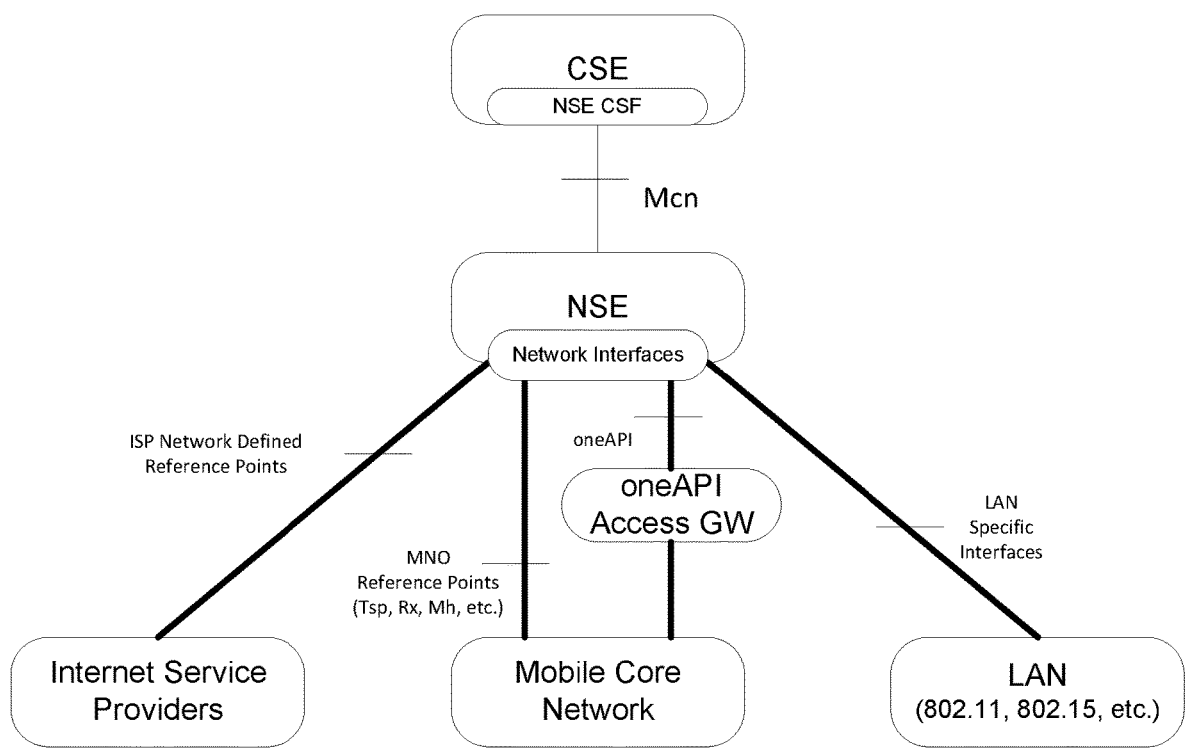
FIG. 23 is a block diagram of example Network Service Entity (NSE) interfaces that can be used by the NAMS in accordance with an example embodiment.

Turning now to interfacing with the underlying networks, example embodiments that include the above-described NAMS messages over the Mcn reference point are now described. Referring to FIG. 23, a block diagram of the NSE, its interface to the CSE, and some example interfaces that are possible towards the underlying network(s) are shown. The Mcn reference point provides oneM2M defined APIs to the CSE for accessing services, for instance the services listed in Table 3 below. The supported services may depend on what is supported by the underlying access network(s) that are being used by each device, the business agreement between the CSE owner and the network operator, and the capabilities of the NSE.

In an example, the NSE's provide a set of base API's that are used by the CSE and NSE for various purposes. For example, the CSE may use the set of base API's to provide the NSE with a mapping between CSE identifiers, Application Identifiers, and access network identifiers. In some cases, the NSE will not recognize CSE or Application identifiers if the base API's are not used to provision this information in the NSE. The NSE may recognize access network identifiers that are not provisioned in NSE. Note that if an application identifier or CSE identifier has no mapping to an access network identifier, then the identifier may have no value (or meaning) to the NSE. The CSE may use the set of base API's to check which services are available for each device, CSE, and application. The CSE may also use the set of base API's to enable services for devices, CSE, and applications.

TABLE 3

Example Services Available on the Mcn

Subscription Management
Offline Charging Event Reporting
Online Charging Event Reporting
Online Charging Credit Management
Triggering
QoS Management
Small Data Exchange
Schedule Coordination
Device Management
SW Install
Device Monitoring
Authentication TABLE 3-continued Example Services Available on the Mcn Authorization
Key Establishment
Presence In an example, the interface to the oneAPI Gateway may be used to expose services such as Voice, SMS, IP Messaging, File Sharing, Video Streaming, Customer Authentication, Location, Charging, and Presence. These services are available to the NSE for supporting the services listed in Table 3.

In another example embodiment, 3GPP interfaces are used. For example, the NSE may have internal logic that maps commands on the Mcn interface to operations over the southbound interface. Described below are examples of how the NSE can be supported in the 3GPP network. In one example, the NSE is distributed and the information is collected at different entities in the 3GPP network wherever the information is generated. The information is sent by multiple reference points, such as Tsp, Rx, Mh for example.

Table 4 (below) lists 3GPP interfaces that may be required to accommodate the services that are listed in Table 3. Note that the Tsp and Rx reference points are defined by 3GPP, but it is recognized herein that new commands (or parameters) can be added to these interfaces to support the M2M Services that are listed in Table 3.

It is recognized herein that the Mh, Mf, and Mo reference points are not fully defined by 3GPP. These reference points are introduced in a 3GPP TR that was created under the MOSAP work item. 3GPP TR 23.862, "EPC Enhancements to Support Interworking with Data Application Providers (MOSAP)," the disclosure of which is incorporated by reference as if set forth in its entirety herein, specifies that the Mh, Mf, and Mo reference points may be based on the Sh, Ro, and Rf reference points, respectively. It is recognized herein that new commands (or parameters) may be added to these interfaces to support the M2M Services that are listed in Table 3.

TABLE 4

3GPP Underlying Network Interfaces

| Reference Point | Purpose | Protocol |
| --- | --- | --- |
| Tsp | MTC Miscellaneous | Diameter |
| Rx | QoS | Diameter |
| Mh | Subscription Management | Diameter |
| Mf | Online Charging | Diameter |
| Mo | Offline Charging | Diameter |
| Le | Location Management | OMA Mobile Location Protocol (MLP) or Open Service Access Application Programming Interface (OSA-API) |
| Zn | Security | Diameter |

Figure 24:
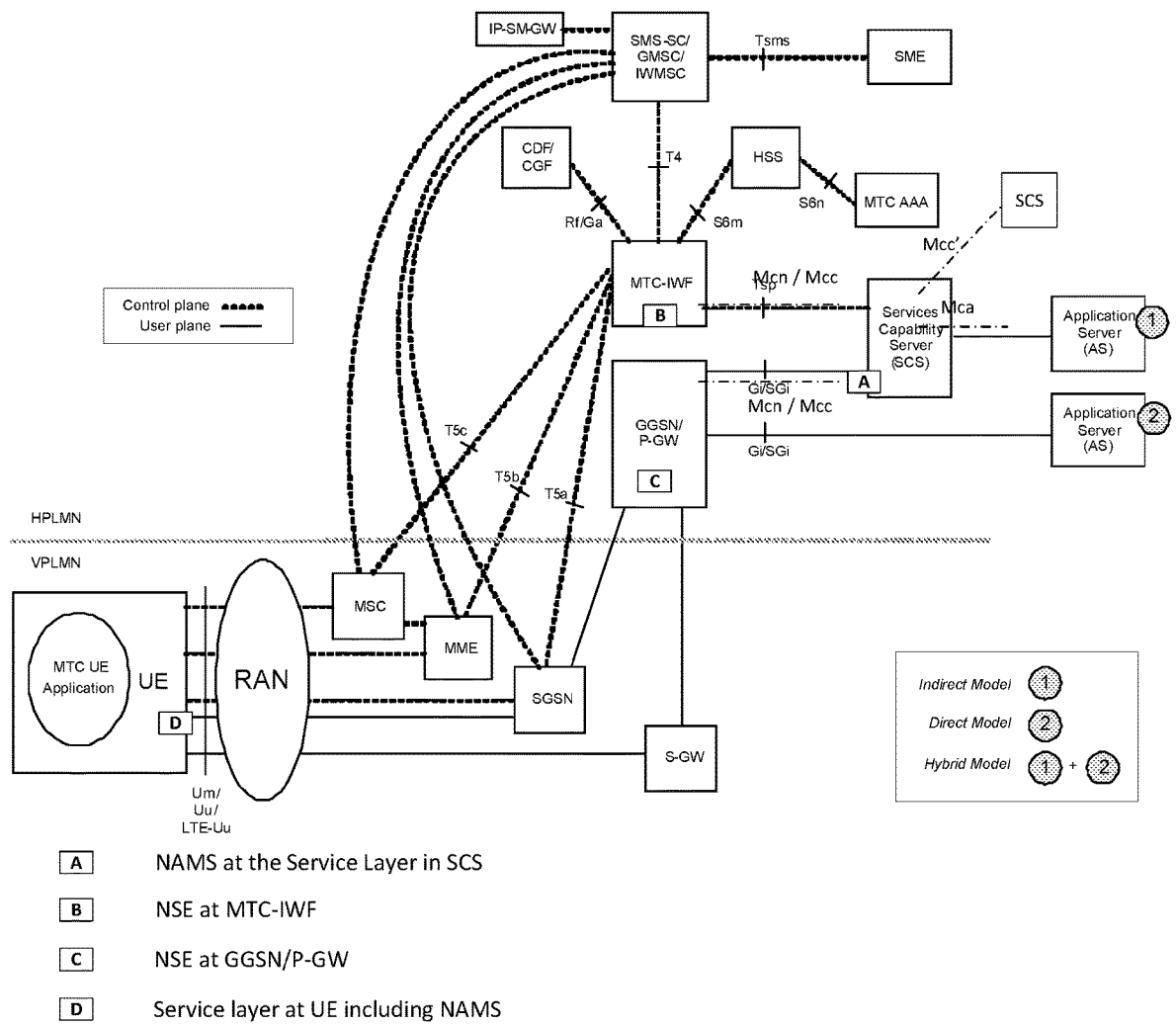
FIG. 24 is a block diagram of a 3GPP Indirect and Hybrid model that includes the NSE interfaces shown in FIG. 23 and the NAMS in accordance with an example embodiment.

Referring now to FIG. 24, FIG. 24 shows a centralized model in which NSE can be supported by the 3GPP network. The NAMS 100 is part of the SCS in the 3GPP Indirect and Hybrid model. In one example, the MTC-IWF has the NSE function, where it can collect network related control plane information from other 3GPP nodes, such as HSS, MSC, MME and SGSN for example. In another example, there may also be NSE at the GGSN/P-GW where the traffic and user plane information can be collected. Thus, the Mcn may be realized by both the Tsp interface and the Gi/SGi interface. The Network Adaptation Service within the SCS may consolidate the network information. The message from SCS to the 3GPP network is split by control plane to MTC-IWF and user plane to GGSN/P-GW. FIG. 24 shows an example of how the NAMS 100 described herein and messages over the reference points can be supported in the 3GPP MTC interworking model. Furthermore, there can be a Service Layer on the UE that includes the NAMS 100 functionality.

Referring now to FIG. 26, an example NAMS graphical user interface (GUI) screen 2600 is shown that may be supported by an M2M/WoT/IoT entity, such as a device, gateways, and/or a servers, to display and/or configure parameters related to network and application/service management. In the example of FIG. 26, settings 2602 relate to information associated with an example application, and settings 2604 correspond to notifications that the NAMS 100 can provide to the application. As shown, the example notifications correspond to events (status updates) associated with the underlying network. The settings 2604 can be displayed to a user so that the user can select an appropriate action for the application to take, based on various network events. Similarly, the settings 2602 can be presented to a user so that the user can input requirements of the application. In practice, other settings and parameters can be selected and displayed, as desired. It will be understood that the network and application management services described herein may be observed and controlled by a user in a number of ways via GUIs.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 25A:
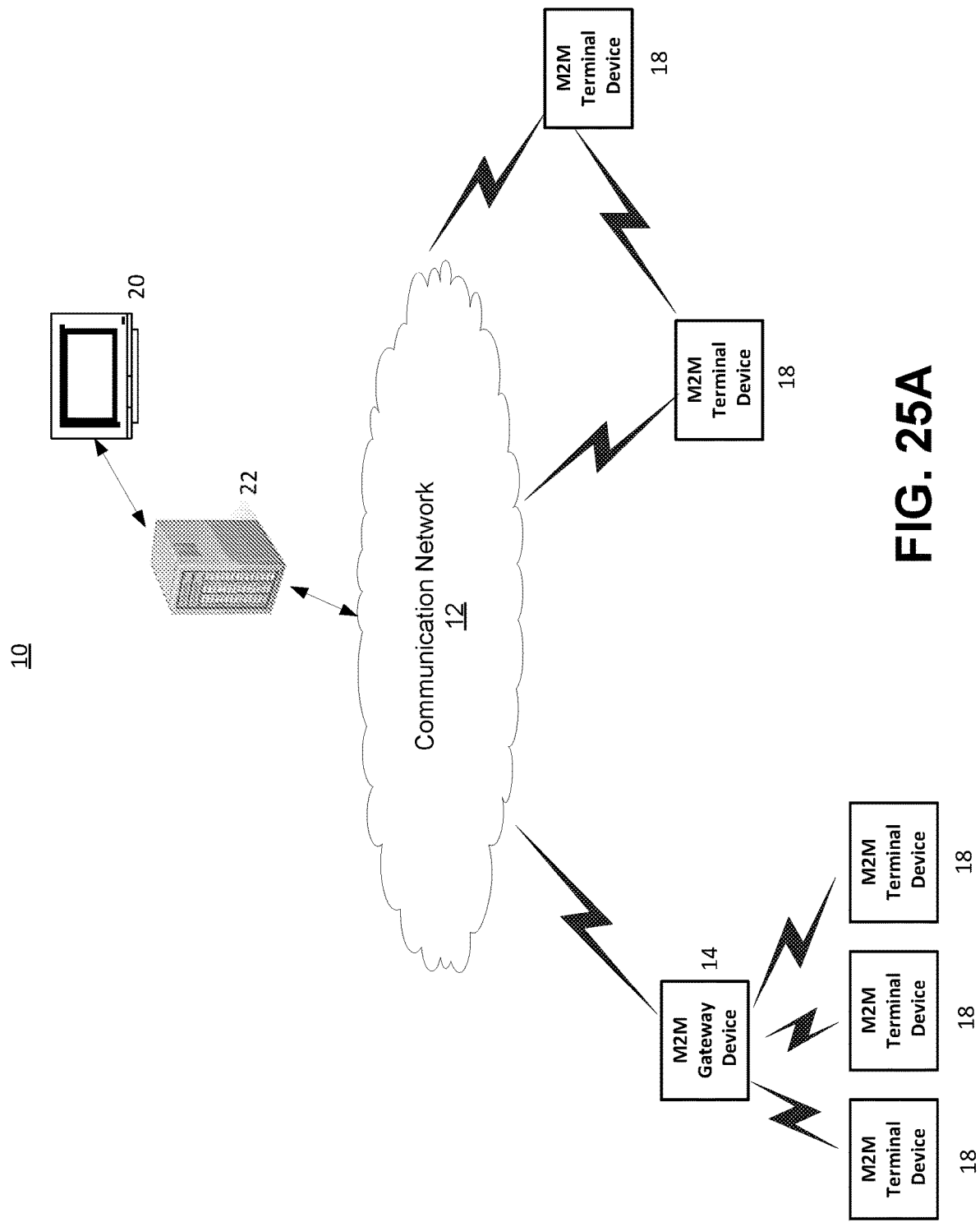
FIG. 25A is a system diagram of an example machine-to-machine (M2M) or Internet of Things (IoT) communication system in which one or more disclosed embodiments may be implemented.

FIG. 25A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the client, proxy, or server devices illustrated in any of FIG. 5-16, 18-22, or 24 may comprise a node of a communication system such as the one illustrated in FIGS. 25A-D.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 25B:
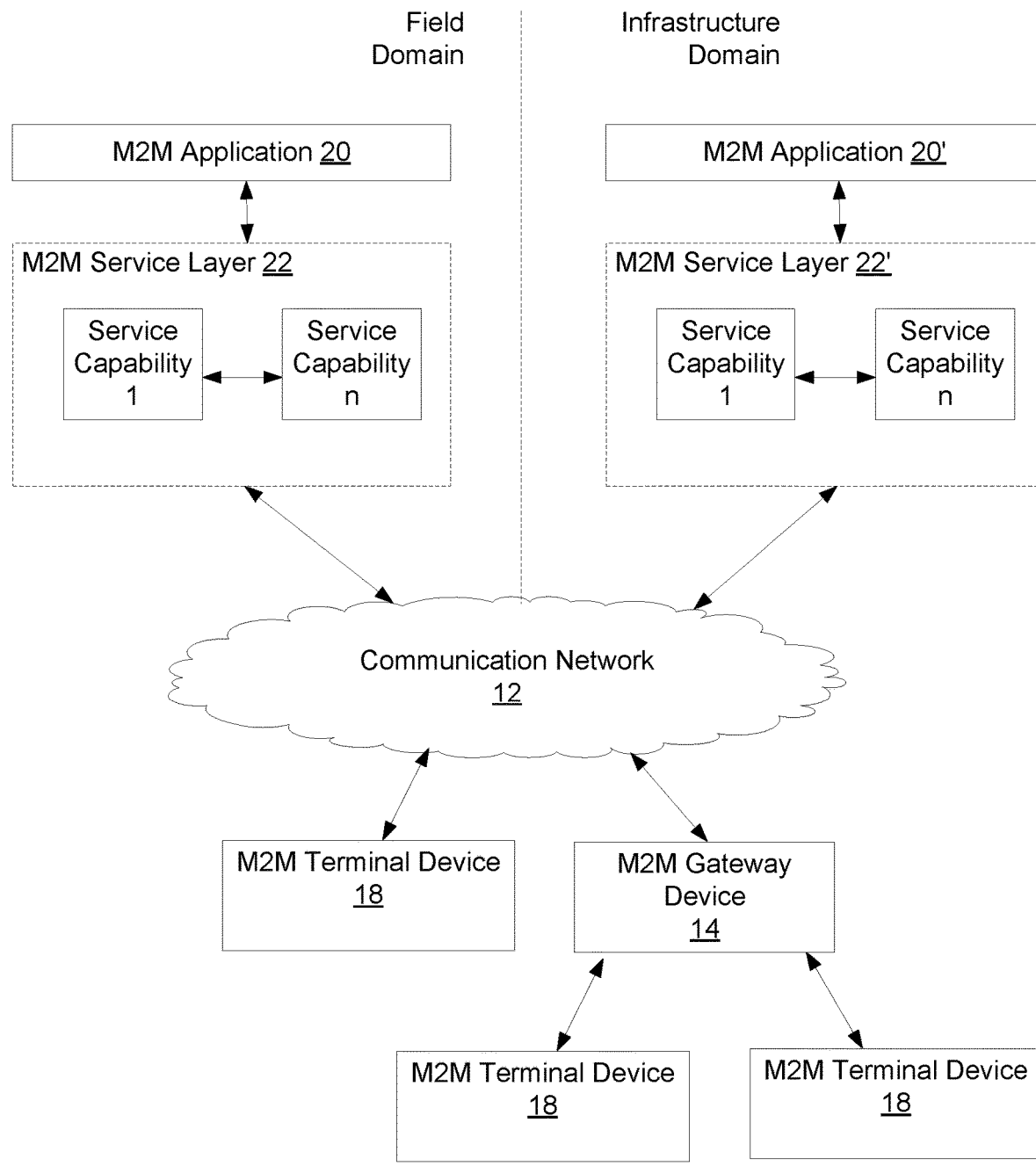
FIG. 25B is a system diagram of an example architecture that may be used within the M2M/IoT communications system illustrated in FIG. 25A.

Referring to FIG. 25B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 25B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 25A and 25B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof (e.g., the NAMS 100) may be implemented in the form of software running on a network node (e.g., server, computer, gateway, device, or the like) having the general architecture illustrated in FIG. 25C or 25D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 25C:
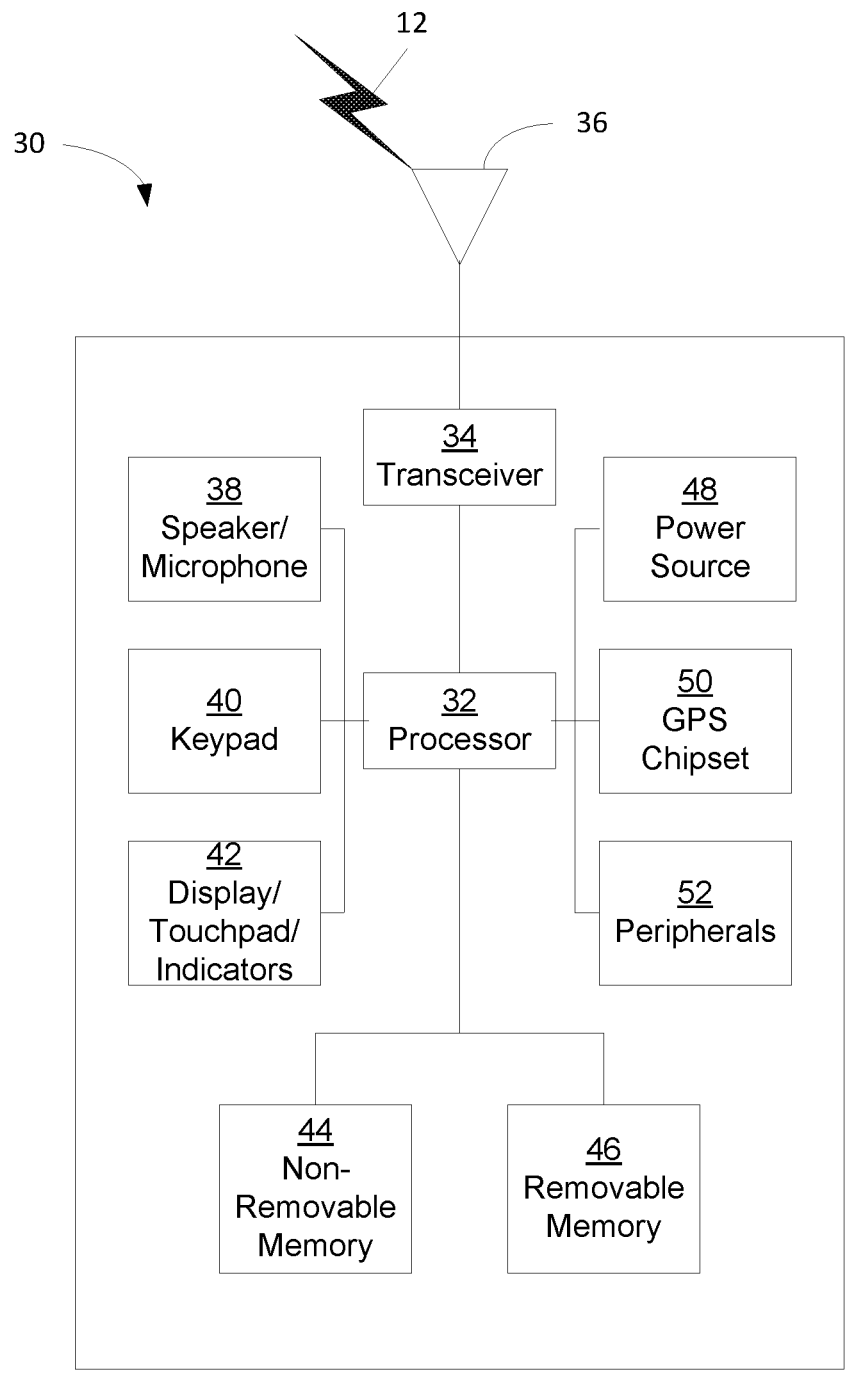
FIG. 25C is a system diagram of an example M2M/IoT terminal or gateway device that may be used within the communications system illustrated in FIG. 25A.

FIG. 25C is a block diagram of an example hardware/software architecture of a node of a network, such as one of the clients, servers, or proxies illustrated in FIG. 5-16, 18-22, or 24 which may operate as an M2M server, gateway, device, or other node in an M2M network such as that illustrated in FIGS. 25A and 25B. As shown in FIG. 25C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the NAMS functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 25C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 25C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 5-16, 18-22, and 24) and in the claims. While FIG. 25C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of the NAMS, and in particular underlying networks, applications, or other services in communication with the NAMS. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 25D:
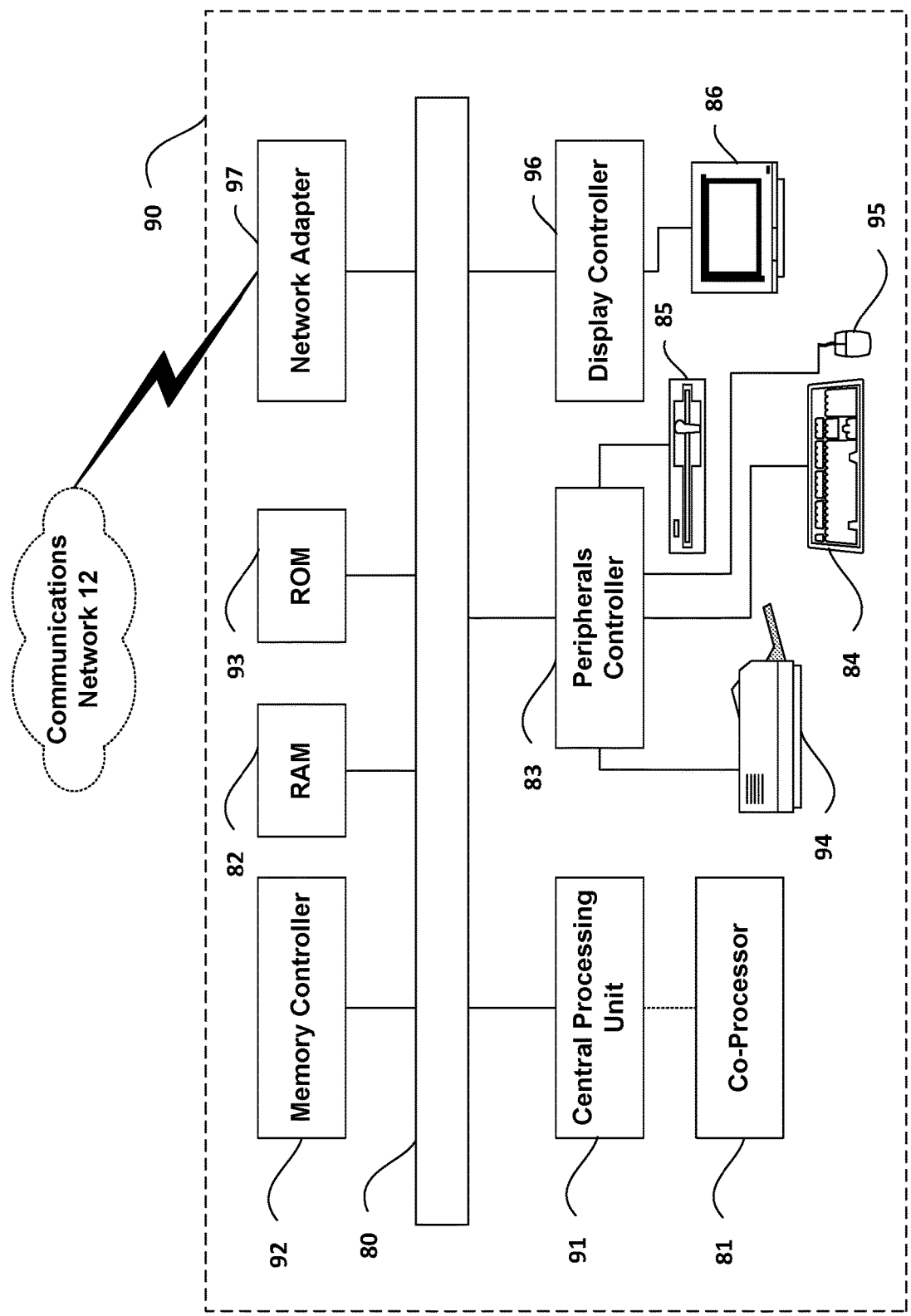
FIG. 25D is a block diagram of an example computing system in which aspects of the communication system of FIG. 25A may be embodied.

FIG. 25D is a block diagram of an exemplary computing system 90 which may also be used to implement one or more nodes of a network, such as the clients, servers, or proxies illustrated in FIGS. 5-16, 18-22, and 24, which may operates as an M2M server, gateway, device, or other node in an M2M network such as that illustrated in FIGS. 25A and 25B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 25A and FIG. 25B, to enable the computing system 90 to communicate with other nodes of the network. The communication circuitry, alone or in combination with the CPU 91, may be used to perform the transitioning and receiving steps described herein (e.g., in FIGS. 5-16, 18-22, and 24) and in the claims.

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level technologies that may appear in the above description.
AE Application Entity
AS Application Server
ASN Application Service Node
CSE Common Service Entity
CSF Common Service Function
D2D Device to Device communication
IE Information Element
IN-CSE Infrastructure CSE
MIB Management Information Base
MTC-IWF Machine Type Communications-InterWorking Function
NAMS Network and Application Management Service
NSE (underlying) Network Service Entity
NSSE Network Service Exposure, Service Execution and Triggering
NW (underlying) Network
OSI Open Systems Interconnection model
RoA Resource Oriented Architecture
SCS Services Capability Server
SL Service Layer
SNMP Simple Network Management Protocol
SoA Service Oriented Architecture This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
   receive a first query for information associated with the network, from an application or a service on the network;
   send a second query, to a first node on the network, in response to receiving the first query from the application or service, wherein the second query comprises a request for the information associated with the network;
   receive, via the communication network from the first node on the network, a first message in response the second query, the first message indicating at least one status update associated with the network;
   store the at least one status update associated with the network;
   determine whether the at least one status update affects the application or the service; and
   if the at least one status update affects the application or the service, send to an M2M device that hosts the application or the service, a second message indicating the at least one status update such that the application or service can take action based on the at least one status update.

2. The apparatus as recited in claim 1, wherein the second message further indicates at least one of a change in a transmission rate of the application or service, a change in the transmission duration of the application or service, a change in a quantity of data associated with the application or service, a change in a resolution associated with the application or service, an instruction to transmit after a predetermined amount of time, an instruction to switch networks, or a second network to which the application or service can switch.

3. The apparatus as recited in claim 1, wherein the at least one status update indicates at least one of a data rate associated with the network, a quality of service provided by the network, a congestion status associated with the network, a packet size associated with the network, a network transmission interval, a maximum data per time unit, one or more devices supported by the network, one or more services supported by the network, or a geographic coverage of the network.

4. The apparatus as recited in claim 1, wherein the apparatus includes a service layer, and the computer-executable instructions further cause the apparatus to:
   in response to one or more services being added to or deleted from the service layer, send a third query comprising a request for the information associated with the network.

5. The apparatus as recited in claim 1, wherein the computer-executable instructions further cause the apparatus to:
   send a third query based on a change in one or more applications connected to the network, the third query comprising a request for the information associated with the network.

6. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
   receive, from a node on the network, a first query message for information associated with an application on the network;
   receive, via the communication network from the application on the network, a first message based on the first query, the first message indicating at least one update associated with the application; and
   store the at least one update associated with the application,
   wherein the apparatus includes a service layer and the first query message is sent based on a connectivity issue associated with the network.

7. The apparatus as recited in claim 6, wherein the computer-executable instructions further cause the apparatus to:
   send to a node on the network a second message indicating the at least one update such that the second node can take action based on the at least one update.

8. The apparatus as recited in claim 6, wherein the computer-executable instructions further cause the apparatus to:
   send to a node on the network a second message indicating at least one of a bandwidth requirement of the application, a quality of service requirement of the application, or a transaction characteristic of the application.

9. The apparatus as recited in claim 6, wherein the at least one update indicates at least one of a status associated with the application, a transmission rate associated with the application, a quantity of data associated with the application, a transmission interval associated with the application, or an action taken by the application.

10. The apparatus as recited in claim 6, wherein the computer-executable instructions further cause the apparatus to:
    send a second query message to the application in response to receiving the first query message from the node, wherein the second query message comprises a request for the information associated with the application.

11. The apparatus as recited in claim 6, wherein the computer-executable instructions further cause the apparatus to:
    send a second query message to the application such that the first message is received in response to the second query message, wherein the second query message comprises a request for information associated with the application.

12. A method for managing nodes in a communications network, the method performed by an apparatus hosting a service layer that communicates over the network, the method comprising:
    receiving a first query for information associated with the network, from an application or a service on the network;
    sending a second query, to a first node on the network, in response to receiving the first query from the application or service, wherein the second query comprises a request for the information associated with the network;
    receiving, via the network from the first node on the network, a first message in response the second query, the first message indicating at least one status update associated with the network;

storing the at least one status update associated with the network;

determining whether the at least one status update affects the application or the service; and if the at least one status update affects the application or the service, sending to an M2M device on the network that hosts the application or the service, a second message indicating the at least one status update such that the application or service can take action based on the at least one status update.

13. The method as recited in claim 12, wherein the second message further indicates at least one of a change in a transmission rate of the application or service, a change in the transmission duration of the application or service, a change in a quantity of data associated with the application or service, a change in a resolution associated with the application or service, an instruction to transmit after a predetermined amount of time, an instruction to switch networks, or a second network to which the application or service can switch.

14. The method as recited in claim 12, wherein the at least one status update indicates at least one of a data rate associated with the network, a quality of service provided by the network, a congestion status associated with the network, a packet size associated with the network, a network transmission interval, a maximum data per time unit, one or more devices supported by the network, one or more services supported by the network, or a geographic coverage of the network.

* * * * *